US012804378B2

(12) United States Patent
Ying

(10) Patent No.: US 12,804,378 B2
(45) Date of Patent: Nov. 17, 2026

(54) COMMUNICATION METHOD AND COMMUNICATION APPARATUS

(71) Applicant: HUAWEI TECHNOLOGIES CO., LTD., Shenzhen (CN)

(72) Inventor: Jiangwei Ying, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 387 days.

(21) Appl. No.: 17/990,922

(22) Filed: Nov. 21, 2022

(65) Prior Publication Data

US 2023/0079012 A1 Mar. 16, 2023

Related U.S. Application Data

(63) Continuation of application No. PCT/CN2021/094491, filed on May 19, 2021.

(30) Foreign Application Priority Data

May 21, 2020 (CN) ........................ 202010438309.4

(51) Int. Cl.
*H04W 8/18* (2009.01)

(52) U.S. Cl.
CPC .................................... *H04W 8/18* (2013.01)

(58) Field of Classification Search
CPC ...................................................... H04W 8/18
USPC .......................................................... 455/418
See application file for complete search history.

(56) References Cited

U.S. PATENT DOCUMENTS 10,028,305 B2 * 7/2018 Han ...................... H04W 68/02
2015/0350877 A1 12/2015 Li et al.
2020/0329455 A1 * 10/2020 Ryu ...................... H04W 76/28

FOREIGN PATENT DOCUMENTS

CN 106385675 A 2/2017
CN 110831148 A 2/2020
EP 2352353 A1 8/2011
(Continued)

OTHER PUBLICATIONS

3GPP TSG-RAN WG Meeting #85 RP-191898 Newport Beach, USA, Sep. 16-20, 2019.*
(Continued)

*Primary Examiner* — Jirapon Tulop
(74) *Attorney, Agent, or Firm* — HAUPTMAN HAM, LLP

(57) ABSTRACT

This application provides a communication method and a communication apparatus, to flexibly enable an MUSIM feature. This helps save network resources. The method includes: A terminal device determines first indication information based on states of a plurality of universal subscriber identity modules USIMs, where the first indication information indicates to enable or disable a paging enhancement function, and/or enable or disable a paging occasion collision avoidance function, and the terminal device includes the plurality of USIMs; and sends the first indication information to an access and mobility management function AMF. Therefore, the terminal device determines whether to enable or disable the MUSIM feature, and notifies, by using the first indication information, the AMF of whether to enable or disable the MUSIM feature, so that the AMF performs a corresponding operation based on content indicated by the first indication information.

26 Claims, 6 Drawing Sheets

(56) References Cited

FOREIGN PATENT DOCUMENTS

| | | | | |
|---|---|---|---|---|
| JP | 2012517781 A | | 8/2012 | |
| WO | WO-2017136078 A1 | * | 8/2017 | ............ H04W 76/28 |

OTHER PUBLICATIONS

Qualcomm Incorporated, Apple, Solution for paging collision avoidance. SA WG2 Meeting #135, Oct. 14-18, 2019, Split, Croatia, S2-1909937, 4 pages.
Vivo, Solution# X: Paging reception for multi-USIM device with 1 Rx. SA WG2 Meeting #136, Nov. 18-22, 2019, Reno, USA, S2-1910984, 9 pages.
Oppo, Solution for Key Issue#2 Paging collision avoidance. SA WG2 Meeting #136, Nov. 18-22, 2019, Reno, U.S.A, S2-1911208, 4 pages.
Nokia, Nokia Shanghai Bell, Solution for improved paging in MUSIM devices (KI#1,2,3). SA WG2 Meeting #136, Reno, Nevada, USA, Nov. 18-22, 2019, S2-191 1673, 7 pages.
Extended European Search Report issued in corresponding European Application No. 21809282.3, dated Sep. 28, 2023, pp. 1-15.
Oppo, Nokia, Nokia Shanghai Bell, China Unicom, Solution for key issue#1 handling of MT service. SA WG2 Meeting #136 AH, Jan. 13-17, 2020, Incheon, Korea, S2-2000308, 7 pages.
Japanese Office Action issued in corresponding Japanese Application No. 2022-570748, dated Dec. 26, 2023, pp. 1-8.
Chinese Office Action issued in corresponding Chinese Application No. 202010438309.4, dated Oct. 9, 2023, pp. 1-16.
Nokia, Nokia Shanghai Bell, KI#3, KI#2: new solution on providing additional info of UE availability. Sa WG2 Meeting #140-e, Aug. 19-Sep. 2, 2020, Online, S2-2005023, 3 pages.
3GPP TS 23.501 V16.4.0 (Mar. 2020), 3rd Generation Partnership Project; Technical Specification Group Services and System Aspects; System architecture for the 5G System (5GS); Stage 2(Release 16), 430 pages.
3GPP TR 23.761 V0.3.0 (Jan. 2020), 3rd Generation Partnership Project; Technical Specification Group Services and System Aspects; Study on system enablers for devices having multiple Universal Subscriber Identity Modules (USIM) (Release 17), 37 pages.
Qualcomm Incorporated, Options for paging collision avoidance. 3GPP TSG-RAN WG2 Meeting #113bis-e, Electronic, Apr. 12-20, 2021, R2-2103225, 3 pages.
SA1 (from S1-190494), new SID: Study on Support for Multi-USIM Devices (Fs_Musim). 3GPP TSG SA Meeting #83 , Shenzhen, P. R. China, Mar. 20-22, 2019, SP-190091, 3 pages.
Qualcomm Incorporated, apple, vivo, CATT, Solution for paging collision avoidance. SA WG2 Meeting #136AH, Jan. 13-17, 2020, Incheon, Korea, S2-2000116, 6 pages.
SA WG2, Revised SID: Study on system enablers for multi-SIM devices. TSG SA Meeting #SP-83, Mar. 20-22, 2019, Shenzhen, China, SP-190248, 4 pages.
CATT, Update of solution: RAN based paging collision avoidance for NR. SA WG2 Meeting #S2-136, Nov. 18-22, 2019, Reno, Nevada, USA, S2-1911066, 3 pages.
Nokia, Nokia Shanghai Bell, Solution for improved paging in MUSIM devices (KI#1,2,3). SA WG2 Meeting #136-AH, Incheon, Korea, Jan. 13-17, 2020 , S2-2000855, 7 pages.
Qualcomm Incorporated, apple, vivo, CATT, Solution for paging collision avoidance. SA WG2 Meeting #136, Nov. 18-22, 2019, Reno, USA, S2-1912399, 7 pages.
Qualcomm Incorporated, apple, Solution for paging collision avoidance. SA WG2 Meeting #136, Nov. 18-22, 2019, Reno, USA, S2-1911729, 5 pages.
International Search Report issued in corresponding International Application No. PCT/CN2021/094491, dated Aug. 12, 2021, pp. 1-10.
Vivo (Moderator):"Report of phase 1 Multi-SIM email discussion", 3GPP TSG-RAN WG Meeting #85, Newport Beach, USA, Sep. 16-20, 2019, RP-191898, total 36 pages.
Office Action issued in KR1020227044266 and mailed Jul. 18, 2025.

* cited by examiner

COMMUNICATION METHOD AND COMMUNICATION APPARATUS

CROSS-REFERENCE TO RELATED APPLICATIONS

This application is a continuation of International Application No. PCT/CN2021/094491, filed on May 19, 2021, which claims priority to Chinese Patent Application No. 202010438309.4, filed on May 21, 2020. The disclosures of the aforementioned applications are hereby incorporated by reference in their entireties.

TECHNICAL FIELD

This application relates to the communications field, and more specifically, to a communication method and a communication apparatus.

BACKGROUND

With development of communication technologies, a plurality of card slots are deployed in a terminal; one universal integrated circuit card (universal integrated circuit card, UICC) on a terminal device stores a plurality of universal subscriber identity modules (universal subscriber identity modules, USIMs) USIMs; or a terminal device may store a plurality of USIMs without a UICC, that is, a soft SIM or a soft USIM is used. In this way, a terminal user holds the plurality of universal subscriber identity modules (universal subscriber identity modules, USIMs) at the same time to perform a communication service. For example, the terminal user may use the plurality of USIMs to contact different user groups or perform different communication services. In addition, in future enterprise scenarios, there is a strong requirement for one terminal to support a plurality of USIMs.

Currently, terminals in the market have different communication capabilities, including 1Rx/1Tx and 2Rx/1Tx capabilities, where a 1Rx communication capability means that a network signal of a public land mobile network (public land mobile network, PLMN) corresponding to only one USIM can be received at the same time. For example, a terminal that has a single-receive single-transmit (single Rx/single Tx) communication capability or a terminal that is configured with independent receive ports (receive, Rx) for different USIMs and in which only one RX is allowed to work at the same time can receive a network signal of a PLMN corresponding to only one USIM at the same time. In other words, at least two Rxs on the UE terminal can serve only one USIM at the same time. In this case, logically, one Rx is used. Consequently, the multi-USIM terminal having such a communication capability may encounter a problem that paging of a USIM cannot be received due to a paging occasion collision (paging occasion collision) (to be specific, paging occasions of at least two USIMs are the same). Therefore, for the terminal having the 1Rx capability, a paging occasion collision avoidance function needs to be performed. For example, an AMF may initiate paging for the USIM for several more times, and prolong a time interval between two times of paging. A RAN may initiate paging for the USIM for several more times, page the USIM at POs of two consecutive DRX cycles of the USIM, and send paging of the USIM at a random PO. Dual Rx/single Tx UE allocates an Rx capability to each USIM, so that signals of two networks can be received at the same time, and a paging collision does not occur. However, because the dual Rx/single Tx UE has only a 1Tx capability and does not support simultaneous communication with two systems over an uplink, an RRC connection between the two networks cannot be maintained. Consequently, when one USIM is in a connected state and is performing a service, and the other USIM has paging triggered by a downlink service, the terminal having the 1Tx capability cannot determine whether to continue to perform the service of the current USIM or transit to perform the service of the other USIM. Therefore, paging enhancement needs to be performed for an MUSIM scenario, so that the UE can continue to perform the service of the current USIM or transit to perform the service of the other USIM. For example, a core network CN notifies the UE of downlink service information by using a paging message, a NAS message, or user plane data, and the UE determines, based on the downlink service information, whether to continue to perform the service of the current USIM or transit to perform the service of the other USIM. Alternatively, based on service information (for example, a service type) of the downlink service and service information that the UE (for example, a USIM 1) reports to a core network CN (for example, an AMF) and that is desired by the UE, the CN (for example, the AMF) needs to determine whether to send a paging message to the UE or determine to notify the UE of existence of the downlink service by using an NAS message or user plane data.

It can be learned that the foregoing problems require MUSIM feature enhancement on the network side, and this results in extra network overheads. However, in a conventional technology, an MUSIM enhancement feature is always enabled, and this results in a waste of network resources.

SUMMARY

In view of this, this application provides a communication method and a communication apparatus, to flexibly enable or disable an MUSIM feature without always enabling the MUSIM feature. This helps save network resources.

According to a first aspect, a communication method is provided. The method includes: A terminal device (or a component, for example, a circuit or a chip, in the terminal device) determines first indication information based on states of a plurality of universal subscriber identity modules USIMs, where the first indication information indicates to enable or disable a paging enhancement function, and/or enable or disable a paging occasion collision avoidance function, and the terminal device includes the plurality of USIMs; and sends the first indication information to an access and mobility management function AMF. Therefore, the terminal device determines whether to enable or disable an MUSIM paging feature, and notifies, by using the first indication information, the AMF of whether to enable or disable the MUSIM paging feature, so that the AMF performs a corresponding operation based on content indicated by the first indication information. In this way, the MUSIM paging feature can be flexibly enabled. This helps save network resources.

Optionally, the paging enhancement function is used to indicate, to the terminal device, service information that triggers paging or filter paging of the terminal device based on service information that triggers paging.

Optionally, that the first indication information indicates to enable or disable a paging enhancement function, and/or enable or disable a paging occasion collision avoidance function includes:

the first indication information indicates to enable or disable the paging enhancement function;

the first indication information indicates to enable or disable the paging occasion collision avoidance function;

the first indication information indicates to enable the paging enhancement function and disable the paging occasion collision avoidance function; or the first indication information indicates to disable the paging enhancement function and enable the paging occasion collision avoidance function.

In this embodiment of this application, there are a plurality of implementations of the first indication information determined by the terminal device based on a multi-USIM state. The following separately describes the implementations.

In a possible implementation, the first indication information indicates to enable the paging enhancement function. The plurality of USIMs include a first USIM and a second USIM. The first USIM is in a connected state, and the second USIM is in an idle/inactive state. That the terminal device sends the first indication information to an AMF includes: The terminal device sends the first indication information to an AMF corresponding to the second USIM.

In a possible implementation, the first indication information indicates to disable the paging enhancement function. The plurality of USIMs include a first USIM and a second USIM. The first USIM is in an idle/inactive state, and the second USIM is in an idle/inactive state. That the terminal device sends the first indication information to an AMF includes: The terminal device sends the first indication information to an AMF corresponding to the first USIM and/or an AMF corresponding to the second USIM.

In a possible implementation, the first indication information indicates to enable the paging occasion collision avoidance function. The plurality of USIMs include a first USIM and a second USIM. The first USIM is in an idle/inactive state, and the second USIM is in an idle/inactive state. A paging occasion PO of the first USIM is the same as a PO of the second USIM. That the terminal device sends the first indication information to an AMF includes: The terminal device sends the first indication information to an AMF corresponding to the first USIM or an AMF corresponding to the second USIM.

In a possible implementation, the first indication information indicates to disable the paging occasion collision avoidance function. The plurality of USIMs include a first USIM and a second USIM. The first USIM is in an idle/inactive state, and the second USIM is in a connected state. That the terminal device sends the first indication information to an AMF includes: The terminal device sends the first indication information to an AMF corresponding to the first USIM.

In a possible implementation, the first indication information indicates to enable the paging occasion collision avoidance function and disable the paging enhancement function. The plurality of USIMs include a first USIM and a second USIM. The first USIM is in an idle/inactive state, and the second USIM is in an idle/inactive state. That the terminal device sends the first indication information to an access and mobility management function AMF includes: The terminal device sends the first indication information to an AMF corresponding to the first USIM or an AMF corresponding to the second USIM.

In a possible implementation, the first indication information indicates to disable the paging occasion collision avoidance function and enable the paging enhancement function. The plurality of USIMs include a first USIM and a second USIM. The first USIM is in an idle/inactive state, and the second USIM is in a connected state. That the terminal device sends the first indication information to an AMF includes: The terminal device sends the first indication information to an AMF corresponding to the first USIM.

According to a second aspect, a communication method is provided. The method includes: An access and mobility management function AMF (or a component, for example, a circuit or a chip, in the AMF) receives first indication information from a terminal device, where the terminal device includes a plurality of USIMs, and the first indication information is determined based on states of the plurality of USIMs. The AMF enables or disables a paging enhancement function based on the first indication information; and/or the AMF enables or disables a paging occasion collision avoidance function based on the first indication information. Therefore, the AMF learns, from the terminal device, whether to enable or disable an MUSIM paging feature, and performs a corresponding operation based on content indicated by the first indication information. In this way, the MUSIM paging feature can be flexibly enabled. This helps save network resources.

Optionally, the paging enhancement function is used to indicate, to the terminal device, service information that triggers paging or filter paging of the terminal device based on service information that triggers paging.

Optionally, that the first indication information indicates to enable or disable the paging enhancement function, and/or enable or disable the paging occasion collision avoidance function includes:

the first indication information indicates to enable or disable the paging enhancement function;

the first indication information indicates to enable or disable the paging occasion collision avoidance function;

the first indication information indicates to enable the paging enhancement function and disable the paging occasion collision avoidance function; or the first indication information indicates to disable the paging enhancement function and enable the paging occasion collision avoidance function.

In a possible implementation, the first indication information indicates to enable the paging enhancement function. The plurality of USIMs include a first USIM and a second USIM. The first USIM is in a connected state, and the second USIM is in an idle/inactive state. The AMF is an AMF corresponding to the second USIM.

Optionally, the method further includes: The AMF sends a subscription request to a session management function SMF of the second USIM, where the subscription request is used to subscribe to the paging enhancement function.

Optionally, the method further includes: The AMF sends a first notification message to an SMF of the second USIM, where the first notification message notifies the SMF to enable the paging enhancement function.

In a possible implementation, the first indication information indicates to disable the paging enhancement function. The plurality of USIMs include a first USIM and a second USIM. The first USIM is in an idle/inactive state, and the second USIM is in an idle/inactive state. The AMF is an AMF corresponding to the first USIM and/or an AMF corresponding to the second USIM.

Optionally, the method further includes: The AMF sends an unsubscription request to an SMF of the second USIM, where the unsubscription request is used to unsubscribe from the paging enhancement function.

Optionally, the method further includes: The AMF sends a second notification message to an SMF corresponding to the first USIM or an SMF corresponding to the second USIM, where the second notification message notifies the SMF to disable the paging enhancement function.

In a possible implementation, the first indication information indicates to enable the paging occasion collision avoidance function. The plurality of USIMs include a first USIM and a second USIM. The first USIM is in an idle/inactive state, and the second USIM is in an idle/inactive state. A paging occasion PO of the first USIM is the same as a PO of the second USIM. The AMF is an AMF corresponding to the first USIM or an AMF corresponding to the second USIM.

Optionally, that the AMF enables the paging occasion collision avoidance function includes: The AMF performs paging processing based on a first attempt quantity and/or a first paging interval, where the first attempt quantity is greater than a second attempt quantity, the first paging interval is greater than a second paging interval, the second attempt quantity is a quantity of paging attempts of the terminal device before the paging occasion collision avoidance function is enabled, and the second paging interval is a paging interval of the terminal device before the paging occasion collision avoidance function is enabled.

Optionally, that the AMF enables the paging occasion collision avoidance function includes: The AMF sends a paging message to an access network device, where the paging message indicates to enable the paging occasion collision avoidance function.

In a possible implementation, the first indication information indicates to disable the paging occasion collision avoidance function. The plurality of USIMs include a first USIM and a second USIM. The first USIM is in an idle/inactive state, and the second USIM is in a connected state. The AMF is an AMF corresponding to the first USIM.

Optionally, that the AMF disables the paging occasion collision avoidance function includes: The AMF performs paging processing based on a second attempt quantity and/or a second paging interval, where the second attempt quantity is less than a first attempt quantity, the second paging interval is less than a first paging interval, the second attempt quantity is a quantity of paging attempts of the terminal device before the paging occasion collision avoidance function is enabled, the second paging interval is a paging interval of the terminal device before the paging occasion collision avoidance function is enabled, the first attempt quantity is a quantity of paging attempts of the terminal device after the paging occasion collision avoidance function is enabled, and the first paging interval is a paging interval of the terminal device after the paging occasion collision avoidance function is enabled.

Optionally, that the AMF disables the paging occasion collision avoidance function includes: The AMF sends a paging message to an access network device, where the paging message indicates to disable the paging occasion collision avoidance function.

In a possible implementation, the first indication information indicates to enable the paging occasion collision avoidance function and disable the paging enhancement function. The plurality of USIMs include a first USIM and a second USIM. The first USIM is in an idle/inactive state, and the second USIM is in an idle/inactive state. The AMF is an AMF corresponding to the first USIM or an AMF corresponding to the second USIM.

In a possible implementation, the first indication information indicates to disable the paging occasion collision avoidance function and enable the paging enhancement function. The plurality of USIMs include a first USIM and a second USIM. The first USIM is in an idle/inactive state, and the second USIM is in a connected state. The AMF is an AMF corresponding to the first USIM.

According to a third aspect, a communication method is provided. The method includes: A terminal device (or a component, for example, a circuit or a chip, in the terminal device) sends states of a plurality of USIMs to an access and mobility management function AMF, where the terminal device includes the plurality of USIMs, and the states of the plurality of USIMs are used to determine second indication information. The terminal device receives the second indication information from the AMF, where the second indication information indicates to enable or disable a paging enhancement function, and/or enable or disable a paging occasion collision avoidance function. Therefore, the terminal device learns, from the AMF, whether to enable or disable an MUSIM paging feature, and does not need to determine whether to enable or disable the MUSIM paging feature. In this way, the MUSIM paging feature can be flexibly enabled. This helps save network resources.

Optionally, the paging enhancement function is used to indicate, to the terminal device, service information that triggers paging or filter paging of the terminal device based on service information that triggers paging.

Optionally, that the second indication information indicates to enable or disable a paging enhancement function, and/or enable or disable a paging occasion collision avoidance function includes:

- the second indication information indicates to enable or disable the paging enhancement function;
- the second indication information indicates to enable or disable the paging occasion collision avoidance function;
- the second indication information indicates to enable the paging enhancement function and disable the paging occasion collision avoidance function; or
- the second indication information indicates to disable the paging enhancement function and enable the paging occasion collision avoidance function.

In a possible implementation, the second indication information indicates to enable the paging enhancement function. The plurality of USIMs include a first USIM and a second USIM. The first USIM is in a connected state, and the second USIM is in an idle/inactive state.

In a possible implementation, the second indication information indicates to disable the paging enhancement function. The plurality of USIMs include a first USIM and a second USIM. The first USIM is in an idle/inactive state, and the second USIM is in an idle/inactive state.

In a possible implementation, the second indication information indicates to enable the paging occasion collision avoidance function. The plurality of USIMs include a first USIM and a second USIM. The first USIM is in an idle/inactive state, and the second USIM is in an idle/inactive state. A paging occasion PO of the first USIM is the same as a PO of the second USIM.

In a possible implementation, the second indication information indicates to disable the paging occasion collision avoidance function. The plurality of USIMs include a first USIM and a second USIM. The first USIM is in an idle/inactive state, and the second USIM is in a connected state.

In a possible implementation, the second indication information indicates to enable the paging occasion collision avoidance function and disable the paging enhancement function. The plurality of USIMs include a first USIM and a second USIM. The first USIM is in an idle/inactive state, and the second USIM is in an idle/inactive state. The AMF is an AMF corresponding to the first USIM or an AMF corresponding to the second USIM.

In a possible implementation, the second indication information indicates to disable the paging occasion collision avoidance function and enable the paging enhancement function. The plurality of USIMs include a first USIM and a second USIM. The first USIM is in an idle/inactive state, and the second USIM is in a connected state. The AMF is an AMF corresponding to the first USIM.

According to a fourth aspect, a communication method is provided. The method includes: An access and mobility management function AMF (or a component, for example, a circuit or a chip, in the AMF) receives states of a plurality of USIMs from a terminal device. The AMF determines second indication information based on the states of the plurality of USIMs, where the second indication information indicates to enable or disable a paging enhancement function, and/or enable or disable a paging occasion collision avoidance function, and the terminal device includes the plurality of USIMs. The AMF sends the second indication information to the terminal device. Therefore, the AMF determines whether to enable or disable an MUSIM paging feature, and notifies, by using the second indication information, the terminal device of whether to enable or disable the MUSIM paging feature. In this way, the MUSIM paging feature can be flexibly enabled. This helps save network resources.

Optionally, the paging enhancement function is used to indicate, to the terminal device, service information that triggers paging or filter paging of the terminal device based on service information that triggers paging.

Optionally, that the second indication information indicates to enable or disable a paging enhancement function, and/or enable or disable a paging occasion collision avoidance function includes:

- the second indication information indicates to enable or disable the paging enhancement function;
- the second indication information indicates to enable or disable the paging occasion collision avoidance function;
- the second indication information indicates to enable the paging enhancement function and disable the paging occasion collision avoidance function; or
- the second indication information indicates to disable the paging enhancement function and enable the paging occasion collision avoidance function.

In this embodiment of this application, there are a plurality of implementations of the second indication information determined by the AMF based on a multi-USIM state. The following separately describes the implementations.

In a possible implementation, the second indication information indicates to enable the paging enhancement function. The plurality of USIMs include a first USIM and a second USIM. The first USIM is in a connected state, and the second USIM is in an idle/inactive state.

Optionally, the method further includes: An AMF corresponding to the second USIM sends a subscription request to a session management function SMF corresponding to the second USIM, where the subscription request is used to subscribe to the paging enhancement function.

Optionally, the method further includes: An AMF corresponding to the second USIM sends a first notification message to a session management function SMF corresponding to the second USIM, where the first notification message notifies the SMF to enable the paging enhancement function.

In a possible implementation, the second indication information indicates to disable the paging enhancement function. The plurality of USIMs include a first USIM and a second USIM. The first USIM is in an idle/inactive state, and the second USIM is in an idle/inactive state.

Optionally, the method further includes: An AMF corresponding to the second USIM sends an unsubscription request to an SMF corresponding to the second USIM, where the unsubscription request is used to unsubscribe from the paging enhancement function.

Optionally, the method further includes: An AMF corresponding to the second USIM sends a second notification message to a session management function SMF corresponding to the second USIM, where the second notification message notifies the SMF to disable the paging enhancement function.

In a possible implementation, the second indication information indicates to enable the paging occasion collision avoidance function. The plurality of USIMs include a first USIM and a second USIM. The first USIM is in an idle/inactive state, and the second USIM is in an idle/inactive state. The second indication information further includes a paging occasion PO of the first USIM and a PO of the second USIM. The PO of the first USIM is the same as the PO of the second USIM. That the AMF sends the second indication information to the terminal device includes: An AMF corresponding to the first USIM or an AMF corresponding to the second USIM sends the second indication information to the terminal device.

Optionally, the method further includes: The AMF corresponding to the first USIM or the AMF corresponding to the second USIM performs paging processing based on a first attempt quantity and/or a first paging interval, where the first attempt quantity is greater than a second attempt quantity, the first paging interval is greater than a second paging interval, the second attempt quantity is a quantity of paging attempts of the terminal device before the paging occasion collision avoidance function is enabled, and the second paging interval is a paging interval of the terminal device before the paging occasion collision avoidance function is enabled.

Optionally, the method further includes: The AMF corresponding to the first USIM or the AMF corresponding to the second USIM sends a paging message to an access network device, where the paging message indicates to enable the paging occasion collision avoidance function.

In a possible implementation, the second indication information indicates to disable the paging occasion collision avoidance function. The plurality of USIMs include a first USIM and a second USIM. The first USIM is in an idle/inactive state, and the second USIM is in a connected state. That the AMF sends the second indication information to the terminal device includes: An access and mobility management function AMF corresponding to the first USIM sends the second indication information to the terminal device.

Optionally, the method further includes: The AMF corresponding to the first USIM performs paging processing based on a second attempt quantity and/or a second paging interval, where the second attempt quantity is a quantity of paging attempts of the terminal device before the paging occasion collision avoidance function is enabled, and the second paging interval is a paging interval of the terminal device before the paging occasion collision avoidance function is enabled.

Optionally, the method further includes: The AMF corresponding to the first USIM sends a paging message to an access network device, where the paging message indicates to disable the paging occasion collision avoidance function.

In a possible implementation, the second indication information indicates to enable the paging occasion collision avoidance function and disable the paging enhancement function. The plurality of USIMs include a first USIM and a second USIM. The first USIM is in an idle/inactive state, and the second USIM is in an idle/inactive state. That the AMF sends the second indication information to the terminal device includes: An AMF corresponding to the first USIM or an AMF corresponding to the second USIM sends the second indication information to the terminal device.

In a possible implementation, the second indication information indicates to disable the paging occasion collision avoidance function and enable the paging enhancement function. The plurality of USIMs include a first USIM and a second USIM. The first USIM is in an idle/inactive state, and the second USIM is in a connected state. That the AMF sends the second indication information to the terminal device includes: An AMF corresponding to the first USIM sends the second indication information to the terminal device.

According to a fifth aspect, a communication apparatus is provided. The apparatus includes modules or units configured to perform the method according to any possible implementation of the first aspect, modules or units configured to perform the method according to any possible implementation of the second aspect, modules or units configured to perform the method according to any possible implementation of the third aspect, or modules or units configured to perform the method according to any possible implementation of the fourth aspect.

According to a sixth aspect, a communication apparatus is provided. The apparatus includes a processor. The processor is coupled to a memory, and may be configured to execute instructions in the memory, to implement the method according to any possible implementation of the first aspect or the third aspect. Optionally, the communication apparatus further includes the memory. Optionally, the communication apparatus further includes a communication interface. The processor is coupled to the communication interface.

In an implementation, the communication apparatus is a terminal device. When the communication apparatus is the terminal device, the communication interface may be a transceiver or an input/output interface.

In another implementation, the communication apparatus is a chip disposed in a terminal device. When the communication apparatus is the chip disposed in the terminal device, the communication interface may be an input/output interface.

Optionally, the transceiver may be a transceiver circuit. Optionally, the input/output interface may be an input/output circuit.

According to a seventh aspect, a communication apparatus is provided. The apparatus includes a processor. The processor is coupled to a memory, and may be configured to execute instructions in the memory, to implement the method according to any possible implementation of the second aspect or the fourth aspect. Optionally, the communication apparatus further includes the memory. Optionally, the communication apparatus further includes a communication interface. The processor is coupled to the communication interface.

In an implementation, the communication apparatus is an AMF. When the communication apparatus is the AMF, the communication interface may be a transceiver or an input/output interface.

In another implementation, the communication apparatus is a chip disposed in an AMF. When the communication apparatus is the chip disposed in the AMF, the communication interface may be an input/output interface.

Optionally, the transceiver may be a transceiver circuit. Optionally, the input/output interface may be an input/output circuit.

According to an eighth aspect, a processor is provided. The processor includes an input circuit, an output circuit, and a processing circuit. The processing circuit is configured to: receive a signal through the input circuit, and transmit a signal through the output circuit, to enable the processor to perform the method according to any possible implementation of the first aspect to the fourth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to a ninth aspect, an apparatus is provided. The apparatus includes a processor and a memory. The processor is configured to: read instructions stored in the memory; receive a signal through a receiver; and transmit a signal through a transmitter, to perform the method according to any possible implementation of the first aspect to the fourth aspect.

Optionally, there are one or more processors and one or more memories.

Optionally, the memory may be integrated with the processor, or the memory and the processor are separately disposed.

In a specific implementation process, the memory may be a non-transitory (non-transitory) memory, for example, a read-only memory (read-only memory, ROM). The memory and the processor may be integrated into one chip, or may be separately disposed in different chips. A type of the memory and a manner in which the memory and the processor are disposed are not limited in this embodiment of this application.

It should be understood that, a related data exchange process, for example, sending of indication information, may be a process of outputting the indication information from the processor, and receiving of indication information may be a process of receiving the input indication information by the processor. Specifically, data output by the processor may be output to a transmitter, and input data received by the processor may be from a receiver. The transmitter and the receiver may be collectively referred to as a transceiver.

The apparatus according to the ninth aspect may be a chip, and the processor may be implemented by using hardware or software. When implemented by using hardware, the processor may be a logic circuit, an integrated circuit, or the like. When implemented by using software, the processor may be a general-purpose processor, and is implemented by reading software code stored in the memory. The memory may be integrated into the processor, or may be independently located outside the processor.

According to a tenth aspect, a computer program product is provided. The computer program product includes a computer program (which may also be referred to as code or instructions). When the computer program is run, a computer is enabled to perform the method according to any possible implementation of the first aspect to the fourth aspect.

According to an eleventh aspect, a computer-readable medium is provided. The computer-readable medium stores a computer program (which may also be referred to as code or instructions). When the computer program is run on a computer, the computer is enabled to perform the method according to any possible implementation of the first aspect to the fourth aspect.

According to a twelfth aspect, a communication system is provided. The system includes the foregoing terminal device and the foregoing AMF.

Optionally, the communication system may further include another device that interacts with the terminal device and/or the AMF, for example, a RAN or an SMF.

DESCRIPTION OF EMBODIMENTS

Figure 1:
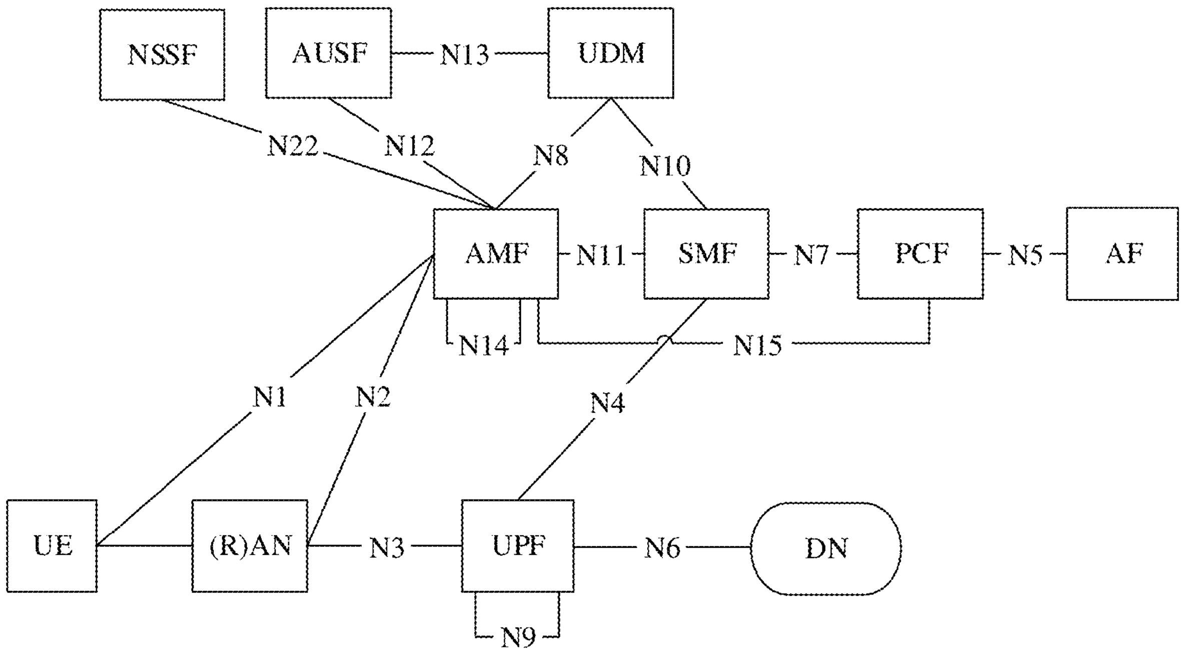
FIG. 1 is a schematic diagram of an architecture of a mobile communication system to which an embodiment of this application is applied.

The following describes technical solutions of this application with reference to the accompanying drawings.

The technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), a worldwide interoperability for microwave access (worldwide interoperability for microwave access, WiMAX) communication system, a 5th generation (5th generation, 5G) system, or a new radio (new radio, NR) system.

The following explains and describes some terms in this application, to facilitate understanding of a person skilled in the art.

(1) A terminal device, also referred to as user equipment (user equipment, UE), a mobile station (mobile station, MS), a mobile terminal (mobile terminal, MT), or the like, is a device that provides voice/data connectivity for a user, for example, a handheld device or a vehicle-mounted device having a wireless connection function. Currently, for example, the terminal is a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self-driving), remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a vehicle-to-everything (vehicle-to-everything, V2X) device, an in-vehicle communication apparatus, or an in-vehicle communication chip.

(2) An access network device is a device in a wireless network, for example, a radio access network (radio access network, RAN) node that connects the terminal to the wireless network. Currently, for example, the RAN node is a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), or a wireless fidelity (wireless fidelity, Wi-Fi) access point (access point, AP). In a network structure, the network device may include a centralized unit (centralized unit, CU) node, or a distributed unit (distributed unit, DU) node, or a RAN device including a CU node and a DU node.

In some deployments, a base station or a transmission point may further include a radio unit (radio unit, RU). The CU implements some functions of the gNB or the transmission point, and the DU implements some functions of the gNB or the transmission point. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical (physical, PHY) layer. Information at the RRC layer eventually becomes information at the PHY layer, or is converted from information at the PHY layer. Therefore, in this architecture, higher layer signaling such as RRC layer signaling or PHCP layer signaling may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

(3) "A plurality of" means two or more, and other quantifiers are similar to this. In embodiments of this application, the terminal device or the access network device includes a hardware layer, an operating system layer running on the hardware layer, and an application layer running on the operating system layer. The hardware layer includes hardware such as a central processing unit (central processing unit, CPU), a memory management unit (memory management unit, MMU), or a memory (also referred to as a main memory). An operating system may be any one or more types of computer operating systems, for example, a Linux operating system, a Unix operating system, an Android operating system, an iOS operating system, or a Windows operating system, that implement service processing through a process (process). The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), or a smart card and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry instructions and/or data.

FIG. 1 is a schematic diagram of an architecture of a basic 5G system. As shown in FIG. 1, the architecture includes an access and mobility management function (access and mobility management function, AMF), a session management function (session management function, SMF), a radio access network (radio access network, RAN), unified data management (unified data management, UDM), a policy control function (policy control function, PCF), a data network (data network, DN), a user plane function (user plane function, UPF), UE, an application function (application function, AF), a network slice selection function (network slice selection function, NSSF), and an authentication server function (authentication server function, AUSF). Optionally, the architecture further includes (not shown in FIG. 1) a network exposure function (network exposure function, NEF), a network repository function (NF repository function, NRF), and a unified data repository (unified data repository, UDR).

Main functions of the network elements are described as follows:

The AF may be understood as a name of an application function network element in the 5G architecture. The application function network element mainly transfers a requirement of an application side on a network side, for example, a quality of service (quality of service, QoS) requirement. The AF may be a third-party functional entity, or may be an application service deployed by a carrier, for example, an IP multimedia subsystem (IP Multimedia Subsystem, IMS) voice call service.

The UDM may be understood as a name of a unified data management network element in the 5G architecture. The unified data management network element mainly includes the following functions: unified data management, authentication credential processing in a 3GPP authentication and key agreement mechanism, user identity processing, access authorization, registration and mobility management, subscription management, short message service management, and the like.

The UDR may be understood as a name of a unified data repository network element in the 5G architecture. The unified data repository network element mainly includes the following functions: storage and retrieval of subscription data, policy data, application data, and other types of data.

The PCF may be understood as a name of a policy control function network element in the 5G architecture. The policy control function network element is mainly responsible for policy control functions such as performing session-level or service flow-level charging, QoS bandwidth guarantee and mobility management, and UE policy decision. In this system, a PCF connected to the AMF is a PCF for access and mobility control (PCF for access and mobility control, AM PCF), and a PCF connected to the SMF is a PCF for session management (PCF for session management, SM PCF). In actual deployment, the AM PCF and the SM PCF may be different PCF entities.

The SMF may be understood as a name of a session management network element in the 5G architecture. The session management network element mainly performs functions such as session management, execution of a control policy delivered by the PCF, UPF selection, and UE IP address allocation.

The AMF may be understood as a name of a mobility management network element in the 5G architecture. The mobility management network element mainly includes the following functions related to access and mobility, for example, connection management, mobility management, registration management, access authentication and authorization, reachability management, and security context management.

The UPF may be understood as a name of a user plane function network element in the 5G architecture. The user plane function network element mainly includes the following functions related to a user plane, for example, packet routing and transmission, packet detection, service usage reporting, QoS processing, lawful interception, uplink packet detection, and downlink packet storage.

The (R)AN is a (radio) access network, and corresponds to different access networks in 5G, for example, a wired access network and a wireless base station access network.

The NSSF may be understood as a name of a network slice selection function network element in the 5G architecture. The network slice selection function network element mainly includes the following functions: selecting a group of network slice instances for the UE, determining allowed NSSAI, determining an AMF set that can serve the UE, and the like.

The AUSF may be understood as a name of an authentication server function network element in the 5G architecture. The authentication server function network element mainly includes the following functions: an authentication server function, interaction with the unified data management network element to obtain user information, and implementation of an authentication-related function, for example, generating an intermediate key.

The NEF may be understood as a name of a capability exposure network element in the 5G architecture. The capability exposure network element mainly includes the following functions: securely opening a service and a capability that are provided by a 3GPP network function, such as internally opening or opening to a third party; and converting or translating information exchanged with the AF and information exchanged with an internal network function, such as an AF service identifier and internal 5G core network information such as a data network name (data network name, DNN), and single network slice selection assistance information (single network slice selection assistance information, S-NSSAI).

The NRF may be understood as a name of a network repository function network element in the 5G architecture. The network repository function network element mainly includes the following functions: a service discovery function, an NF (network function, NF) text for maintaining an available network function instance, and a service supported by the network repository function network element.

Functions of interfaces are described as follows:

N7 represents an interface between the PCF and SMF, and is configured to deliver a PDU session granularity and a service data flow granularity control policy.

N15 represents an interface between the PCF and the AMF, and is configured to deliver a UE policy and an access control related policy.

N5 represents an interface between the AF and the PCF, and is configured to deliver an application service request and report a network event.

N4 represents an interface between the SMF and the UPF, and is configured to transmit information between a control plane and the user plane, including delivery of forwarding rules, QoS control rules, traffic statistics rules, and the like from the control plane to the user plane, and reporting of user-plane information.

N11 represents an interface between the SMF and the AMF, and is configured to: transfer PDU session tunnel information between the RAN and the UPF, transfer a control message to be sent to the UE, transfer radio resource control information to be sent to the RAN, and so on.

N2 represents an interface between the AMF and the RAN, and is configured to: transmit radio bearer control information from a core network side to the RAN, and so on.

N1 represents an interface between the AMF and the UE, is access-irrelevant, and is configured to: transmit the QoS control rule to the UE, and so on.

N8 represents an interface between the AMF and the UDM, and is used by the AMF to obtain, from the UDM, subscription data related to access and mobility management and authentication data, and used by the AMF to register current mobility management related information of the UE with the UDM.

N10 represents an interface between the SMF and the UDM, and is used by the SMF to obtain, from the UDM, subscription data related to session management, and used by the SMF to register current session related information of the UE with the UDM.

N12 represents an interface between the AMF and the AUSF, and is used by the AMF to obtain an authentication parameter, a security key, and the like of the UE from the AUSF.

N22 represents an interface between the AMF and the NSSF, and is used by the AMF to obtain, from the NSSF, the network slice selection assistance information NSSAI that the UE is allowed to use.

N35 (not shown in FIG. 1) represents an interface between the UDM and the UDR, and is used by the UDM to obtain user subscription data information from the UDR.

N36 (not shown in FIG. 1) represents an interface between the PCF and UDR, and is used by the PCF to obtain policy-related subscription data and application data related information from the UDR.

N3 represents an interface between the RAN and the UPF, and is configured to transmit user plane data between the RAN and the UPF.

N6 represents an interface between the UPF and the DN, and is configured to transmit the user plane data between the UPF and the DN.

N9 represents an interface between UPFs, for example, an interface between a visited-policy control function (visited-policy control function, V-PCF) and a home-policy control function (home-policy control function, H-PCF), or an interface between a UPF connected to the DN and a UPF connected to the RAN, and is configured to transmit the user plane data between the UPFs.

It may be understood that the architecture in FIG. 1 is merely used as an example for description herein, but does not constitute a limitation on this embodiment of this application.

In a current MUSIM communication scenario, a terminal device may have a plurality of card slots, and a terminal user has a requirement of holding a plurality of USIMs at the same time, to contact different user groups or be used for different communication services. In addition, in future enterprise scenarios, there is a strong requirement for one terminal to support a plurality of USIMs. Different USIMs in a multiple universal subscriber identity module MUSIM in the terminal device may belong to a same MNO, or may belong to different MNOs. This is not limited.

The terminal device has different communication capabilities, for example, may be single-receive single-transmit single Rx/single Tx UE, dual-receive single-transmit dual Rx/single Tx UE, and dual-receive dual-transmit dual Rx/dual Tx UE.

The single Rx/single Tx UE can receive a signal of only one PLMN at the same time. Consequently, a paging occasion collision (paging occasion collision) may occur. The dual Rx/single Tx UE allocates an Rx capability to each USIM, so that signals of two networks can be received at the same time, and a paging collision does not occur. However, because the dual Rx/single Tx UE has only a 1Tx capability and does not support simultaneous communication with two systems over an uplink, an RRC connection between the two networks cannot be maintained. Consequently, when one USIM is in a connected state and is performing a service, and the other USIM has paging triggered by a downlink service, the terminal device having the 1Tx capability cannot determine whether to continue to perform the service of the current USIM or transit to perform the service of the other USIM.

In the current MUSIM communication scenario, to avoid the foregoing problems, a network always enables an MUSIM feature (including an MUSIM paging enhancement feature and/or an MUSIM paging occasion collision avoidance feature) for the terminal device, and this results in additional consumption of network resources. This application provides a communication method and a communication apparatus, to flexibly enable the MUSIM feature without always enabling the MUSIM feature, so that an unnecessary waste of the network resources is avoided.

For unified description herein, "enable or disable" in this application may also be replaced with "activate or deactivate", or may be understood as "use or not use". This is not specifically limited.

The following describes a related embodiment in which the terminal device determines to enable or disable the MUSIM feature.

It should be noted that, when sending first indication information to an AMF, the terminal device can send the first indication information to the AMF only in a connected state. Therefore, that the terminal device includes a USIM 1 and a USIM 2 is used as an example. When the USIM 1 or the USIM 2 is in an idle state but needs to send the first indication information to an AMF of the USIM 1 or the USIM 2, the USIM 1 or the USIM 2 of the terminal device needs to transit to a connected state, and then sends the first indication information to the AMF of the USIM 1 or the USIM 2. In this case, the terminal device needs to consider that this is a temporary state caused by reporting the first indication information, instead of considering that this requires determining and reporting operations, of enabling or disabling the MUSIM feature, caused by a state change. For example, if the USIM 1 is in an idle state, and the USIM 2 is in an idle state or transits from a connected state to an idle state, the terminal device determines that a paging occasion collision avoidance function needs to be enabled, and chooses to send the first indication information to the AMF of the USIM 2, to indicate to enable the paging occasion collision avoidance function. In this case, the USIM 2 transits to the connected state, sends the first indication to the AMF of the USIM 2, and then transits to the idle state. In this way, the terminal device does not consider that the USIM 2 enters the connected state because the USIM 2 reports the first indication information, but determines that the collision avoidance function needs to be disabled because the USIM 2 is in the connected state.

It should be noted that the terminal device sends the first indication information to the AMF in two manners. 1. For the terminal device, when the USIM 1 or the USIM 2 is in the idle state but needs to send the first indication information to the AMF of the USIM 1 or the USIM 2, the USIM 1 or the USIM 2 of the terminal device may transit to the connected state, send the first indication information to the AMF of the USIM 1 or the USIM 2, and then transit to the idle state. 2. Alternatively, for the terminal device, before entering the idle state, the USIM 1 or the USIM 2 may send the first indication information to the AMF of the USIM 1 or the USIM 2, and then transit to the idle state. In this way, the USIM 1 or the USIM 2 may not transit, after entering the idle state, to the connected state again to send the first indication information to the AMF of the USIM 1 or the USIM 2. A manner in which the terminal device sends the first indication information to the AMF is not specifically limited.

Figure 2:
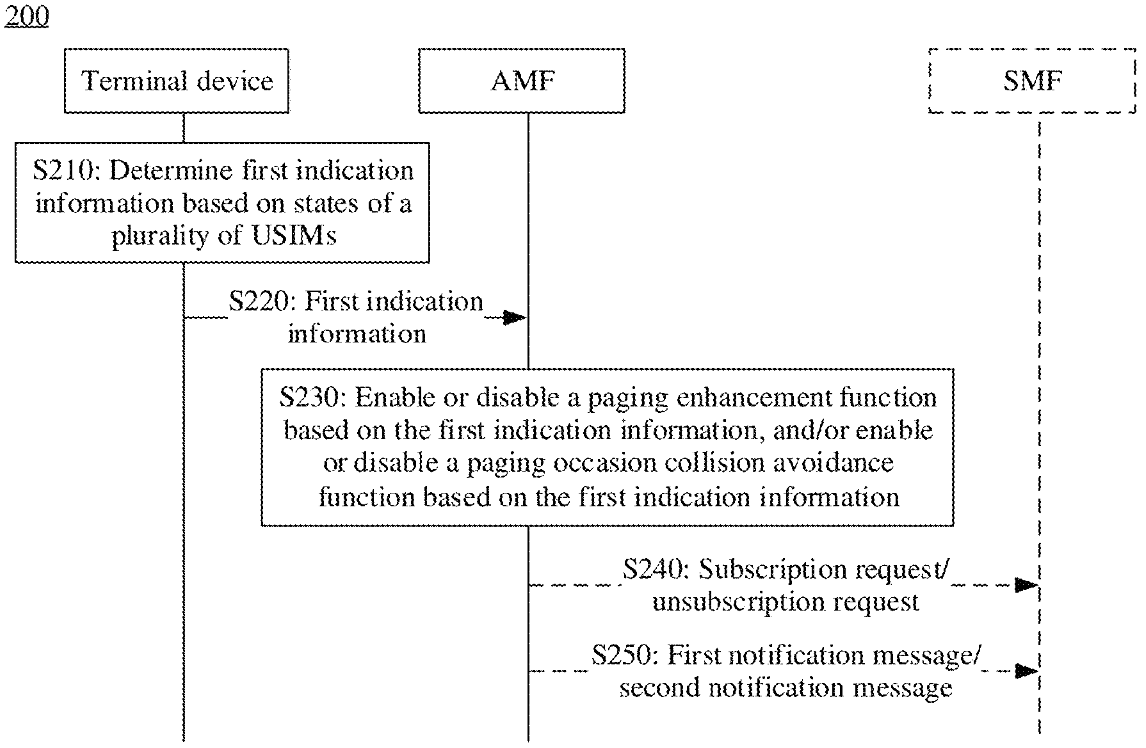
FIG. 2 is a schematic interaction diagram of a communication method according to an embodiment of this application.

FIG. 2 is a schematic diagram of a communication method 200 according to an embodiment of this application. It should be understood that receiving and sending may be performed by including, in a message in an existing standard, content related to receiving and sending in an interaction procedure in FIG. 2. For a specific meaning of the message, refer to descriptions in the standard. Alternatively, receiving and sending may be performed by using a newly defined message. This is not limited in this application. As shown in FIG. 2, the method 200 includes the following steps.

S210: A terminal device determines first indication information based on states of a plurality of universal subscriber identity modules USIMs, where the first indication information indicates to enable or disable a paging enhancement function, and/or enable or disable a paging occasion collision avoidance function, and the terminal device includes the plurality of USIMs.

Optionally, the paging enhancement function is used to indicate, to the terminal device, service information that triggers paging or filter paging of the terminal device based on service information that triggers paging.

Herein, unified descriptions are provided. The paging enhancement function may also be referred to as an MUSIM paging enhancement feature. Optionally, the paging enhancement function may be used to filter paging of the terminal device based on the service information that triggers paging. An AMF determines, based on service information reported by the terminal device (for example, a USIM 1) and the service information that triggers paging, whether to send a paging message to the terminal device or send downlink service information to the terminal device by using a NAS message or user plane data. For example, the service information reported by the terminal device is an allowlist. In this case, if the service information that triggers paging is in the allowlist, the AMF sends the paging message to the terminal device, or sends the downlink service information to the terminal device by using the NAS message or the user plane data; or if the service information that triggers paging is not in the allowlist, the AMF neither sends the paging message to the terminal device, nor sends the downlink service information to the terminal device by using the NAS message or the user plane data. The service information reported by the terminal device is a blocklist. In this case, if the service information that triggers paging is in the blocklist, the AMF neither sends the paging message to the terminal device, nor sends the downlink service information to the terminal device by using the NAS message or the user plane data; or if the service information that triggers paging is not in the blocklist, the AMF sends the paging message to the terminal device, or sends the downlink service information to the terminal device by using the NAS message or the user plane data. Optionally, the paging enhancement function may alternatively be: A core network CN obtains downlink service information of a USIM 1, and notifies the terminal device of the downlink service information by using a paging message, a NAS message, or user plane data. Then, the terminal device determines, based on the downlink service information of the USIM 1, whether to continue to perform a service of a current USIM 2 or transit to perform a service of the USIM 1. Before the terminal device receives the downlink service information of the USIM 1, the USIM 2 is in a connected state.

Herein, unified descriptions are provided. The paging occasion collision avoidance function may also be referred to as an MUSIM paging occasion collision avoidance feature. The paging occasion collision avoidance function is used to avoid a paging occasion collision between USIMs of the terminal device. For example, when paging is triggered by downlink data or signaling, the AMF or a RAN increases a quantity of USIM paging attempts, and/or prolongs a paging interval between every two paging attempts. For another example, a RAN generates (or calculates) enhancement of a paging occasion, for example, prepares two paging occasions for one USIM of the terminal device in one paging cycle (for example, a DRX cycle), pages one USIM of the terminal device on paging occasions in two consecutive paging cycles (for example, DRX cycles), randomizes a paging occasion of one USIM, or sets a paging occasion offset for one USIM of the terminal device.

Optionally, that the first indication information indicates to enable or disable a paging enhancement function, and/or enable or disable a paging occasion collision avoidance function includes:

the first indication information indicates to enable or disable the paging enhancement function;

the first indication information indicates to enable or disable the paging occasion collision avoidance function;

the first indication information indicates to enable the paging enhancement function and disable the paging occasion collision avoidance function; or the first indication information indicates to disable the paging enhancement function and enable the paging occasion collision avoidance function.

S220: The terminal device sends the first indication information to the access and mobility management function AMF. Correspondingly, the AMF receives the first indication information.

S230: The first indication information indicates to enable or disable the paging enhancement function, and the AMF enables or disables the paging enhancement function based on the first indication information; and/or the first indication information indicates to enable or disable the paging occasion collision avoidance function, and the AMF enables or disables the paging occasion collision avoidance function based on the first indication information.

In this embodiment of this application, the terminal device determines whether to enable or disable an MUSIM paging feature, and notifies, by using the first indication information, the AMF of whether to enable or disable the MUSIM paging feature, so that the AMF performs a corresponding operation based on content indicated by the first indication information. In this way, the MUSIM paging feature can be flexibly enabled. This helps save network resources.

A state of a USIM includes a connected state (Connected) or an idle/inactive state (IDLE/Inactive); in other words, includes a connection management connected state (CM-Connected) or a connection management idle/radio resource control inactive state (CM-IDLE/RRC-Inactive); in other words, includes a radio resource control connected state (RRC-Connected) or a radio resource control idle/radio resource control inactive state (RRC-IDLE/RRC-Inactive). The following uses an example in which a state of a USIM includes a connected state (Connected) or an idle/inactive state for description. The terminal device may determine, based on the states of the plurality of USIMs, whether to enable the MUSIM paging feature. The following separately provides descriptions.

For the paging enhancement function, the terminal device monitors the states of the plurality of USIMs, so that the terminal device can determine, based on the states of the plurality of USIMs, to enable or disable the paging enhancement function. Optionally, the "states of the plurality of USIMs" implicitly include information about a multi-USIM quantity of the terminal device.

(1) In a possible implementation, the first indication information indicates to enable the paging enhancement function. The plurality of USIMs include a first USIM and a second USIM. The first USIM is in a connected state, and the second USIM is in an idle/inactive state. That the terminal device sends the first indication information to the AMF includes: The terminal device sends the first indication information to an AMF corresponding to the second USIM. The second USIM may be understood as a current USIM.

For example, it is assumed that a communication capability of the terminal device is 1Tx/1Rx or 1Tx/2Rx. Two USIMs are used as an example. If the first USIM is in the connected state, and the second USIM is in the idle/inactive state, the terminal device sets the paging enhancement function to be enabled for the second USIM, and sends the first indication information to the AMF.

After receiving the first indication information that indicates to enable the paging enhancement function, the AMF may send a subscription request to an SMF, to subscribe to the paging enhancement function. Optionally, the method 200 further includes: S240: The AMF sends the subscription request to the session management function SMF, where the subscription request is used to subscribe to the paging enhancement function. Herein, to enable the paging enhancement function, the paging enhancement function may be added to an SMF service in advance, that is, subscription to the paging enhancement function is added. In this way, when enabling the paging enhancement function based on the first indication information, the AMF can subscribe to the paging enhancement function from the SMF.

The SMF receives the subscription request from the AMF, and enables the paging enhancement function based on the subscription request. The SMF sends a subscription response message to the AMF in response to the subscription request.

Optionally, that the SMF enables the paging enhancement function based on the subscription request includes: The SMF obtains a paging indication of the downlink data or signaling, where the paging indication may indicate control plane session management SM signaling, an IMS voice, an IMS short message, an IMS service other than the IMS voice and the IMS short message, a non-IMS service, an application ID, or the like.

Optionally, that the SMF obtains a paging indication of the downlink data or signaling includes: The SMF generates the paging indication based on the downlink data or signaling. Alternatively, the SMF indicates a UPF to generate the paging indication based on the downlink data.

Alternatively, after receiving the first indication information that indicates to enable the paging enhancement function, the AMF may send a notification to an SMF, to notify the SMF to enable the paging enhancement function. For example, when the downlink data arrives, the SMF does not need to obtain service information of the downlink data and send the service information to the AMF. Optionally, the method 200 further includes: S250: The AMF sends a first notification message to the session management function SMF, where the first notification message notifies the SMF to enable the paging enhancement function. Herein, the AMF may notify the SMF to enable the paging enhancement function. Herein, to enable the paging enhancement function, the paging enhancement function may be added to an AMF service in advance, that is, subscription to the paging enhancement function is added. In this way, when the AMF notifies the SMF to enable the paging enhancement function, the SMF can enable the paging enhancement function, that is, subscribe to the paging enhancement function from the AMF.

The SMF receives the first notification message from the AMF, and enables the paging enhancement function based on the first notification message. The SMF sends a first notification response message to the AMF in response to the first notification message.

Optionally, that the SMF enables the paging enhancement function based on the first notification message includes: The SMF obtains a paging indication of the downlink data or signaling, where the paging indication may indicate control plane session management SM signaling, an IMS voice, an IMS short message, an IMS service other than the IMS voice and the IMS short message, a non-IMS service, an application ID, or the like.

Optionally, that the SMF obtains a paging indication of the downlink data or signaling includes: The SMF generates the paging indication based on the downlink data or signaling. Alternatively, the SMF indicates a UPF to generate the paging indication based on the downlink data.

Optionally, the AMF may send a response message for the first indication information to the terminal device.

(2) Optionally, for the paging enhancement function, the first indication information in this embodiment of this application may alternatively be triggered by state transition of a USIM. The "state transition" includes: transition from a connected state to an idle/inactive state, transition from an idle/inactive state to a connected state, or the like. In other words, when a state of one or more of the plurality of USIMs is transited, the terminal device determines the first indication information.

In a possible implementation, the first indication information indicates to enable the paging enhancement function. The plurality of USIMs include a first USIM and a second USIM. The first USIM is in a connected state, and the second USIM transits from a connected state to an idle/inactive state. S220 includes: The terminal device sends the first indication information to an access and mobility management function AMF corresponding to the second USIM.

In other words, if the first USIM is in the connected state, and the second USIM transits from the connected state to the idle/inactive state through state transition, the terminal device may send the first indication information to the AMF of the second USIM, to indicate to enable the paging enhancement function.

It may be understood that only an example in which the state of the second USIM is transited is used herein for description. However, this application is not limited thereto. If the state of the first USIM is transited, this application is still applicable.

For behavior of the AMF and an SMF, refer to descriptions in (1). In (2), the AMF refers to the AMF of the second USIM, and the SMF refers to an SMF of the second USIM.

(3) In another possible implementation, the first indication information indicates to disable the paging enhancement function. The plurality of USIMs include a first USIM and a second USIM. The first USIM is in an idle/inactive state, and the second USIM is in an idle/inactive state. That the terminal device sends the first indication information to the AMF includes: The terminal device sends the first indication information to an AMF corresponding to the first USIM and/or an AMF corresponding to the second USIM. The second USIM may be understood as a current USIM.

In other words, it is assumed that a communication capability of the terminal device is 1Tx/1Rx or 1Tx/2Rx. Two USIMs are used as an example. If the first USIM is in the idle/inactive state, and the second USIM is in the idle/inactive state, the terminal device sets the paging enhancement function to be disabled for the second USIM, and sends the first indication information to the AMF.

After receiving the first indication information that indicates to disable the paging enhancement function, the AMF may send an unsubscription request to an SMF, to unsubscribe from the paging enhancement function. Optionally, the method 200 further includes: S240: The AMF sends the unsubscription request to the session management function SMF, where the unsubscription request is used to unsubscribe from the paging enhancement function. Herein, to disable the paging enhancement function, the paging enhancement function may be added to an SMF service in advance, that is, subscription to the paging enhancement function is added. In this way, when disabling the paging enhancement function based on the first indication information, the AMF can unsubscribe from the paging enhancement function from the SMF.

The SMF receives the unsubscription request from the AMF, and disables the paging enhancement function based on the unsubscription request. The SMF sends an unsubscription response message to the AMF in response to the unsubscription request.

Optionally, that the SMF disables the paging enhancement function based on the unsubscription request includes: The SMF does not obtain a paging indication of the downlink data or signaling, where the paging indication may indicate control plane session management SM signaling, an IMS voice, an IMS short message, an IMS service other than the IMS voice and the IMS short message, a non-IMS service, an application ID, or the like.

Optionally, that the SMF does not obtain a paging indication of the downlink data or signaling includes: The SMF does not generate the paging indication. Alternatively, the SMF does not indicate a UPF to generate the paging indication based on the downlink data.

Alternatively, after receiving the first indication information that indicates to disable the paging enhancement function, the AMF may send a notification to an SMF, to notify the SMF to disable the paging enhancement function. For example, when the downlink data arrives, the SMF does not need to obtain service information of the downlink data and send the service information to the AMF. Optionally, the method 200 further includes: S250: The AMF sends a second notification message to the session management function SMF, where the second notification message notifies the SMF to disable the paging enhancement function. Herein, the AMF may notify the SMF to disable the paging enhancement function. Herein, to disable the paging enhancement function, the paging enhancement function may be added to an AMF service in advance, that is, subscription to the paging enhancement function is added. In this way, when the AMF notifies the SMF to disable the paging enhancement function, the SMF can disable the paging enhancement function, that is, unsubscribe from the paging enhancement function from the AMF.

The SMF receives the second notification message from the AMF, and disables the paging enhancement function based on the second notification message. The SMF sends a second notification response message to the AMF in response to the second notification message.

Optionally, that the SMF disables the paging enhancement function based on the second notification message includes: The SMF does not obtain a paging indication of the downlink data or signaling, where the paging indication may indicate control plane session management SM signaling, an IMS voice, an IMS short message, an IMS service other than the IMS voice and the IMS short message, a non-IMS service, an application ID, or the like.

Optionally, that the SMF does not obtain a paging indication of the downlink data or signaling includes: The SMF does not generate the paging indication. Alternatively, the SMF does not indicate a UPF to generate the paging indication based on the downlink data.

Alternatively, the paging indication may be a service indication, service information, or the like.

Optionally, the AMF may send a response message for the first indication information to the terminal device.

Optionally, for the paging enhancement function, the first indication information in this embodiment of this application may alternatively be triggered by state transition of a USIM. The "state transition" includes: transition from a connected state to an idle/inactive state, transition from an idle/inactive state to a connected state, or the like.

(4) In a possible implementation, the first indication information indicates to disable the paging enhancement function. The plurality of USIMs include a first USIM and a second USIM. The first USIM is in an idle/inactive state, and the second USIM transits from a connected state to an idle/inactive state. S220 includes: The terminal device sends the first indication information to an access and mobility management function AMF of the second USIM.

In other words, if the first USIM is in the idle/inactive state, and the second USIM transits from the connected state to the idle/inactive state through state transition, the terminal device may send the first indication information to the AMF of the second USIM, to indicate to disable the paging enhancement function.

It may be understood that only an example in which the state of the second USIM is transited is used herein for description. However, this application is not limited thereto. If the state of the first USIM is transited, this application is still applicable.

For behavior of the AMF and an SMF, refer to descriptions in (3). In (4), the AMF refers to the AMF of the second USIM, and the SMF refers to an SMF of the second USIM.

In another possible implementation, if the terminal device is a single USIM, the terminal device may disable the paging enhancement function, and send the first indication information to the AMF, where the first indication information indicates to disable the paging enhancement function.

For the paging occasion collision avoidance function, the terminal device monitors the states of the plurality of USIMs, so that the terminal device can determine, based on the states of the plurality of USIMs, to enable or disable the paging occasion collision avoidance function. Optionally, the "states of the plurality of USIMs" implicitly include information about a multi-USIM quantity of the terminal device. Optionally, the terminal device may further consider paging occasions of the USIMs, to determine to enable or disable the paging occasion collision avoidance function.

(5) In a possible implementation, the first indication information indicates to enable the paging occasion collision avoidance function. The plurality of USIMs include a first USIM and a second USIM. The first USIM is in an idle/inactive state, and the second USIM is in an idle/inactive state. A paging occasion PO of the first USIM is the same as or overlaps a PO of the second USIM. That the terminal device sends the first indication information to the AMF includes: The terminal device sends the first indication information to an AMF corresponding to the first USIM or an AMF corresponding to the second USIM.

For example, it is assumed that a communication capability of the terminal device is 1Tx/1Rx. Two USIMs are used as an example. If the first USIM is in the idle/inactive state, the second USIM is in the idle/inactive state, and paging occasions of the two USIMs are the same, the terminal device sets the paging occasion collision avoidance function to be enabled for the first USIM or the second USIM, and sends the first indication information to the AMF of the first USIM or the AMF of the second USIM.

After the AMF receives the first indication information that indicates to enable the paging occasion collision avoidance function, that the AMF enables the paging occasion collision avoidance function includes: The AMF performs paging processing based on a first attempt quantity and/or a first paging interval, where the first attempt quantity is greater than a second attempt quantity, the first paging interval is greater than a second paging interval, the second attempt quantity is a quantity of paging attempts of the terminal device before the paging occasion collision avoidance function is enabled, and the second paging interval is a paging interval of the terminal device before the paging occasion collision avoidance function is enabled.

In other words, the AMF may avoid a collision between the paging occasion of the first USIM and the paging occasion of the second USIM by increasing the attempt quantity and/or increasing the paging interval.

Optionally, that the AMF enables the paging occasion collision avoidance function includes: The AMF sends a paging message to an access network device, where the paging message indicates to enable the paging occasion collision avoidance function. In other words, the AMF may notify the access network device of an indication for enabling the paging occasion collision avoidance function, so that the access network device enhances the paging occasion collision avoidance function. For example, the access network device may prepare two paging occasions for a USIM in one paging cycle, page one USIM of the terminal device on paging occasions in two consecutive paging cycles (for example, DRX cycles), randomize a paging occasion of one USIM, or set a paging occasion offset for one USIM of the terminal device.

Optionally, for the paging occasion collision avoidance function, the first indication information in this embodiment of this application may alternatively be triggered by state transition of a USIM. The "state transition" includes: transition from a connected state to an idle/inactive state, transition from an idle/inactive state to a connected state, or the like.

(6) In a possible implementation, the first indication information indicates to enable the paging occasion collision avoidance function. The plurality of USIMs include a first USIM and a second USIM. The first USIM is in an idle/inactive state, and the second USIM transits from a connected state to an idle/inactive state. A paging occasion PO of the first USIM is the same as a PO of the second USIM. S220 includes: The terminal device sends the first indication information to an AMF corresponding to the first USIM or an access and mobility management function AMF corresponding to the second USIM.

In other words, if the first USIM is in the idle/inactive state, the second USIM transits from the connected state to the idle/inactive state through state transition, and the paging occasion PO of the first USIM is the same as the PO of the second USIM, the terminal device may send the first indication information to the AMF of the second USIM, to indicate to enable the paging occasion collision avoidance function.

It may be understood that only an example in which the state of the second USIM is transited is used herein for description. However, this application is not limited thereto. If the state of the first USIM is transited, this application is still applicable.

For behavior of the AMF and an SMF, refer to descriptions in (5). In (6), the AMF refers to the AMF of the first USIM or the second USIM.

(7) In another possible implementation, the first indication information indicates to disable the paging occasion collision avoidance function. The plurality of USIMs include a first USIM and a second USIM. The first USIM is in an idle/inactive state, and the second USIM is in a connected state. That the terminal device sends the first indication information to the AMF includes: The terminal device sends the first indication information to an AMF corresponding to the first USIM.

For example, it is assumed that a communication capability of the terminal device is 1Tx/1Rx. Two USIMs are used as an example. If the first USIM is in the idle/inactive state, and the second USIM is in the connected state, the terminal device sets the paging occasion collision avoidance function to be disabled for the second USIM, and sends the first indication information to the AMF.

After the AMF receives the first indication information that indicates to disable the paging occasion collision avoidance function, optionally, that the AMF disables the paging occasion collision avoidance function includes:

the AMF performs paging processing based on a second attempt quantity and/or a second paging interval, where the second attempt quantity is less than a first attempt quantity, the second paging interval is less than a first paging interval, the second attempt quantity is a quantity of paging attempts of the terminal device before the paging occasion collision avoidance function is enabled, the second paging interval is a paging interval of the terminal device before the paging occasion collision avoidance function is enabled, the first attempt quantity is a quantity of paging attempts of the terminal device after the paging occasion collision avoidance function is enabled, and the first paging interval is a paging interval of the terminal device after the paging occasion collision avoidance function is enabled.

In other words, the AMF needs to perform additional processing (for example, increase the attempt quantity and/or increase the paging interval), that is, perform normal paging processing for the terminal device.

Optionally, that the AMF disables the paging occasion collision avoidance function includes: The AMF sends a paging message to an access network device, where the paging message indicates to disable the paging occasion collision avoidance function. In other words, the AMF may notify the access network device of an indication for disabling the paging occasion collision avoidance function, so that the access network device does not need to enhance the paging occasion collision avoidance function.

Optionally, for the paging occasion collision avoidance function, the first indication information in this embodiment of this application may alternatively be triggered by state transition of a USIM. The "state transition" includes: transition from a connected state to an idle/inactive state, transition from an idle/inactive state to a connected state, or the like.

(8) In a possible implementation, the first indication information indicates to disable the paging occasion collision avoidance function. The plurality of USIMs include a first USIM and a second USIM. The first USIM is in an idle/inactive state, and the second USIM transits from an idle/inactive state to a connected state. S220 includes: The terminal device sends the first indication information to an access and mobility management function AMF of the first USIM.

In other words, if the first USIM is in the idle/inactive state, and the second USIM transits from the idle/inactive state to the connected state through state transition, the terminal device may send the first indication information to the AMF of the first USIM, to indicate to disable the paging occasion collision avoidance function.

It may be understood that only an example in which the state of the second USIM is transited is used herein for description. However, this application is not limited thereto. If the state of the first USIM is transited, this application is still applicable.

For behavior of the AMF and an SMF, refer to descriptions in (7). In (8), the AMF refers to the AMF of the first USIM.

In another possible implementation, if the terminal device is a single USIM, the terminal device may disable the paging occasion collision avoidance function, and send the first indication information to the AMF, where the first indication information indicates to disable the paging occasion collision avoidance function.

According to the states of the two USIMs, the paging occasion collision avoidance function and the paging enhancement function are mutually exclusive. In this case, actually, one piece of indication information may indicate to enable one feature and disable the other feature. The following provides detailed descriptions.

Optionally, the first indication information may indicate to enable the paging occasion collision avoidance function and disable the paging enhancement function, or indicate to disable the paging occasion collision avoidance function and enable the paging enhancement function.

(9) In a possible implementation, the first indication indicates to enable the paging occasion collision avoidance function and disable the paging enhancement function. The plurality of USIMs include a first USIM and a second USIM. The first USIM is in an idle/inactive state, and the second USIM is in an idle/inactive state. S220 includes: The terminal device sends the first indication information to an access and mobility management function AMF corresponding to the first USIM or the second USIM.

Optionally, the first indication indicates to enable the paging occasion collision avoidance function and disable the paging enhancement function. The plurality of USIMs include a first USIM and a second USIM. The first USIM is in an idle/inactive state, and the second USIM transits from a connected state to an idle/inactive state. The terminal device sends the first indication information to an access and mobility management function AMF of the second USIM.

(10) In another possible implementation, the first indication indicates to disable the paging occasion collision avoidance function and enable the paging enhancement function. The plurality of USIMs include a first USIM and a second USIM. The first USIM is in an idle/inactive state, and the second USIM is in a connected state. S220 includes: The terminal device sends the first indication information to an access and mobility management function AMF of the first USIM.

Optionally, the first indication indicates to disable the paging occasion collision avoidance function and enable the paging enhancement function. The plurality of USIMs include a first USIM and a second USIM. The first USIM is in an idle/inactive state, and the second USIM transits from an idle/inactive state to a connected state. The terminal device sends the first indication information to an access and mobility management function AMF corresponding to the first USIM.

Figure 3:
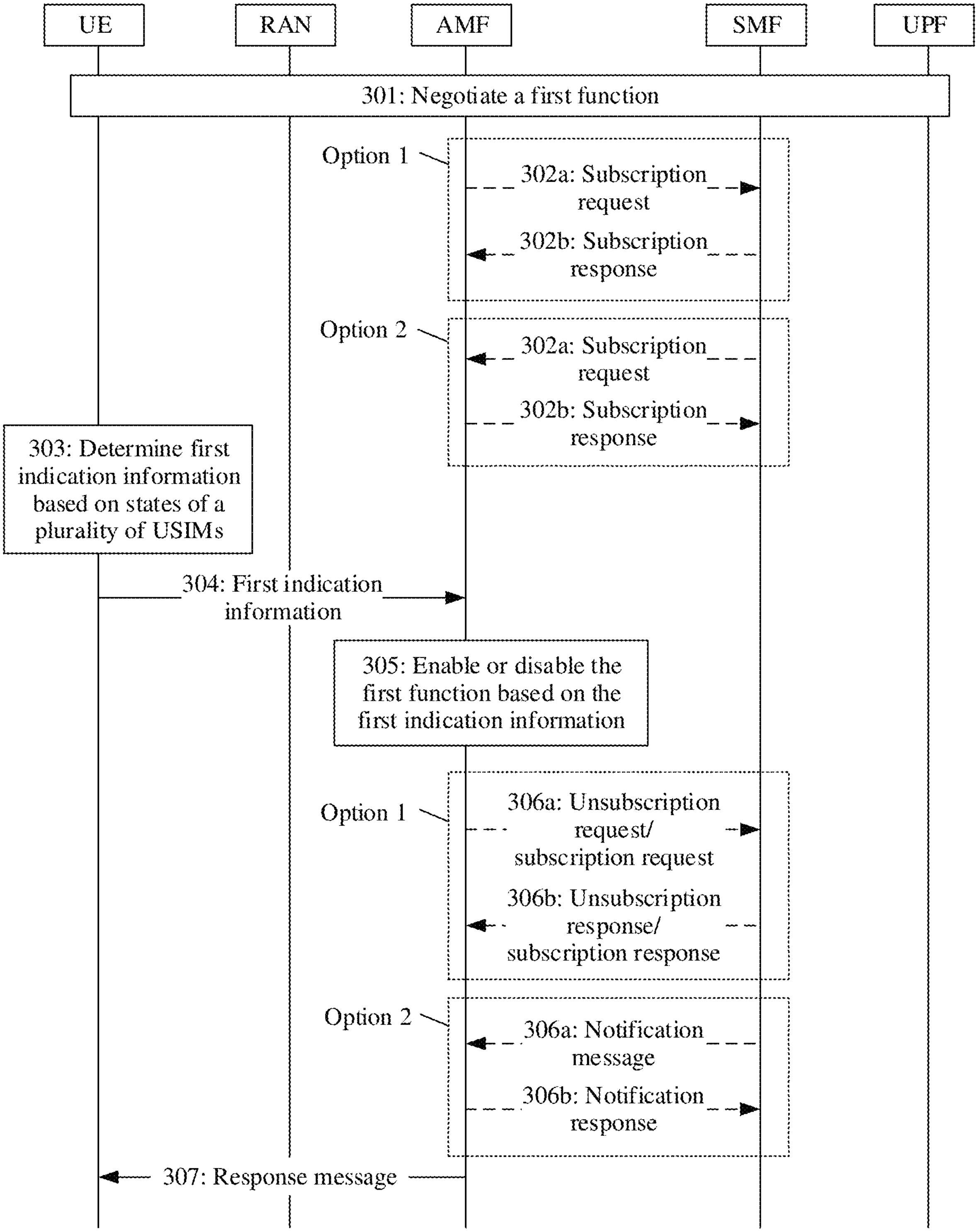
FIG. 3 is a schematic diagram of an example of a communication method according to an embodiment of this application.

For ease of understanding, descriptions are provided below with reference to an example in FIG. 3. For ease of description, a first function is introduced in FIG. 3. It is assumed that the first function includes an MUSIM paging enhancement feature (or referred to as a paging enhancement function). As shown in FIG. 3, the procedure includes the following steps.

301: Negotiate the first function.

For example, the first function includes the MUSIM paging enhancement feature (or referred to as the paging enhancement function). For a terminal device having an MUSIM capability, UE (for example, a USIM 1), an AMF, an SMF, and a UPF negotiate the MUSIM paging enhancement feature, namely, paging enhancement triggered by a downlink service. An optional paging enhancement function may specifically include: The SMF/UPF or the AMF detects downlink data or signaling of the USIM 1, to obtain corresponding service information, for example, a service type (service type). The AMF sends a paging message including the service information to a RAN node. The RAN node further indicates the paging message including the service information to the UE. Alternatively, the AMF notifies the UE of downlink service information by using a NAS message or user plane data, so that the UE can determine, based on the downlink service information of the USIM 1, whether to continue to perform a service of a USIM (for example, a USIM 2) that is currently in a connected state or transit to perform a service of the USIM 1. Before the UE receives the downlink service information of the USIM 1, the USIM 2 is in the connected state.

Another optional paging enhancement may specifically include: being used to filter paging of the terminal device based on service information that triggers paging. The UE reports service information desired by a USIM to the AMF, for example, through a registration procedure or a service request procedure. The AMF stores the service information. When the USIM in an idle state has a downlink service, the AMF determines, based on service information of the downlink service and the service information, whether to send a paging message to the terminal device or send downlink service information to the UE by using a NAS message or user plane data. For example, the service information reported by the terminal device is an allowlist. In this case, if the service information that triggers paging is in the allowlist, the AMF sends the paging message to the terminal device, or sends the downlink service information to the UE by using the NAS message or the user plane data; or if the service information that triggers paging is not in the allowlist, the AMF neither sends the paging message to the terminal device, nor sends the downlink service information to the UE by using the NAS message or the user plane data. The service information reported by the terminal device is a blocklist. In this case, if the service information that triggers paging is in the blocklist, the AMF neither sends the paging message to the terminal device, nor sends the downlink service information to the UE by using the NAS message or the user plane data; or if the service information that triggers paging is not in the blocklist, the AMF sends the paging message to the terminal device, or sends the downlink service information to the UE by using the NAS message or the user plane data.

Optionally, 302: Add a service for subscribing to the MUSIM paging enhancement feature.

After the MUSIM paging enhancement feature is negotiated, to flexibly and dynamically enable or disable a corresponding MUSIM feature, two services can be added during subscription to the MUSIM feature between the AMF and SMF.

Option 1: Subscription to the MUSIM feature is added to an SMF service. In this way, when determining that the MUSIM feature is transited from being enabled to being disabled or the MUSIM feature is transited from being disabled to being enabled, the AMF may subscribe to or unsubscribe from an MUSIM service of the AMF from the SMF.

302*a*: The AMF sends a subscription request to the SMF, to subscribe to the service and enable the MUSIM paging enhancement feature. 302*b*: The SMF sends a subscription response to the AMF.

Option 2: Subscription to the MUSIM paging enhancement feature is added to an AMF service. 302*a*: The SMF sends a subscription request to the AMF, to subscribe to the MUSIM paging enhancement feature. That is, the SMF is notified when the paging enhancement feature needs to be enabled or disabled for the MUSIM UE, so that the SMF determines whether to obtain a paging cause based on the downlink data. 302*b*: The AMF sends a subscription response to the SMF. In this way, when determining that the MUSIM feature is transited from being enabled to being disabled or the MUSIM feature is transited from being disabled to being enabled, the AMF may notify the SMF.

303: The UE determines first indication information based on states of a plurality of USIMs.

For example, the UE determines, based on at least one of a multi-USIM capability, a multi-USIM quantity, and a multi-USIM state of the UE, whether a network needs to enable the MUSIM paging enhancement feature. The first indication information indicates to enable or disable the MUSIM paging enhancement feature.

Herein, for a manner in which the UE determines the first indication information, refer to the foregoing descriptions. Details are not described herein again.

304: The UE sends the first indication information to the AMF.

For example, the UE sends a request message to the AMF, where the request message carries indication information for enabling/disabling the MUSIM paging enhancement feature, namely, the first indication information. Optionally, the request message may be a registration request or a service request message, or may be a UL NAS transport message or another NAS message after the UE (USIM) enters the connected state.

305: The AMF enables or disables the first function based on the first indication information.

For example, the AMF determines, based on the first indication information, that the MUSIM paging enhancement feature needs to be enabled or disabled, and determines an SMF network element that needs to be contacted. SMFs corresponding to all established PDU sessions of the USIM may be notified, or only an SMF corresponding to a part of established PDU sessions of the USIM may be notified (for example, the MUSIM paging enhancement feature is enabled only for specific NSSAI and/or a specific DN).

The AMF needs to notify the SMF of transition of the MUSIM paging enhancement feature from being enabled to being disabled or transition of the MUSIM paging enhancement feature from being disabled to being enabled.

Optionally, corresponding to option 1 in 302, in 306*a*, the AMF sends an unsubscription request to the SMF; and in 306*b*, the SMF sends an unsubscription response to the AMF.

Optionally, corresponding to option 2 in 302, in 306*a*, the AMF sends a notification message to the SMF; and in 306*b*, the SMF sends a notification response to the AMF.

307: The AMF returns a response message to the UE.

The following uses an example in which the first function includes an MUSIM paging collision avoidance feature for description. As shown in FIG. 3, the following steps are included.

301: Negotiate the first function.

For example, the first function includes the MUSIM paging collision avoidance feature (or referred to as a paging occasion collision avoidance function). UE and an AMF negotiate the MUSIM paging collision avoidance feature, that is, when paging is triggered by a downlink service, the following operation may be performed. For example, during paging policy enhancement, when paging is triggered by downlink data or signaling, the AMF or a RAN increases a quantity of UE (namely, USIM) paging attempts, and prolongs a paging interval between every two times of paging. For another example, the AMF indicates the paging collision avoidance feature in a paging message to a RAN, so that the RAN generates (or calculates) enhancement of a PO, for example, prepares two POs for one USIM of the UE in one paging cycle (for example, a DRX cycle), pages one USIM of a terminal device on paging occasions in two consecutive paging cycles (for example, DRX cycles), randomizes a paging occasion of one USIM, or sets a paging occasion offset for one USIM of a terminal device.

303: The UE determines first indication information based on states of a plurality of USIMs.

For example, the UE determines, based on states of two USIMs and depending on whether current POs of the two USIMs are the same (where POs of the UE in different cells may be different), whether a network needs to enable the MUSIM paging collision avoidance feature.

Herein, for a manner in which the UE determines the first indication information, refer to the foregoing descriptions. Details are not described herein again.

304: The UE sends the first indication information to the AMF.

For example, the UE sends a request message to the AMF, where the request message carries indication information for enabling/disabling the MUSIM paging collision avoidance feature, namely, the first indication information. Optionally, the request message may be a registration request or a service request message, or may be a UL NAS transport message or another NAS message after the UE (USIM) enters the connected state.

305: The AMF enables or disables the first function based on the first indication information.

For example, the AMF determines, based on the first indication information, that the MUSIM paging occasion collision avoidance feature needs to be disabled. In this case, when UE paging is triggered subsequently by the downlink data or signaling, the AMF performs the following operation: not performing paging policy enhancement, that is, performing common UE paging processing, or not indicating paging conflict avoidance in the paging message to the RAN.

For example, the AMF determines, based on the first indication information, that the MUSIM paging occasion collision avoidance feature needs to be enabled. In this case, when UE paging is triggered subsequently by the downlink data or signaling, the AMF performs the following operation: performing paging policy enhancement, or optionally, indicating paging conflict avoidance in the paging message to the RAN.

307: The AMF returns a response message to the UE.

It may be understood that various possible implementations of the first indication information are applicable to the procedure in FIG. 3. In FIG. 3, only a part of implementations is used as an example for description. Actually, an implementation of the first indication information that is not listed is also applicable to FIG. 3. For example, in FIG. 3, the first indication information indicates to enable the paging enhancement function and disable the paging occasion collision avoidance function; or the first indication information indicates to disable the paging enhancement function and enable the paging occasion collision avoidance function.

The foregoing describes an embodiment in which the terminal device determines to enable or disable the paging enhancement function and/or enable or disable the paging occasion collision avoidance function. The following describes an embodiment in which the AMF determines to enable or disable the paging enhancement function and/or enable or disable the paging occasion collision avoidance function.

Figure 4:
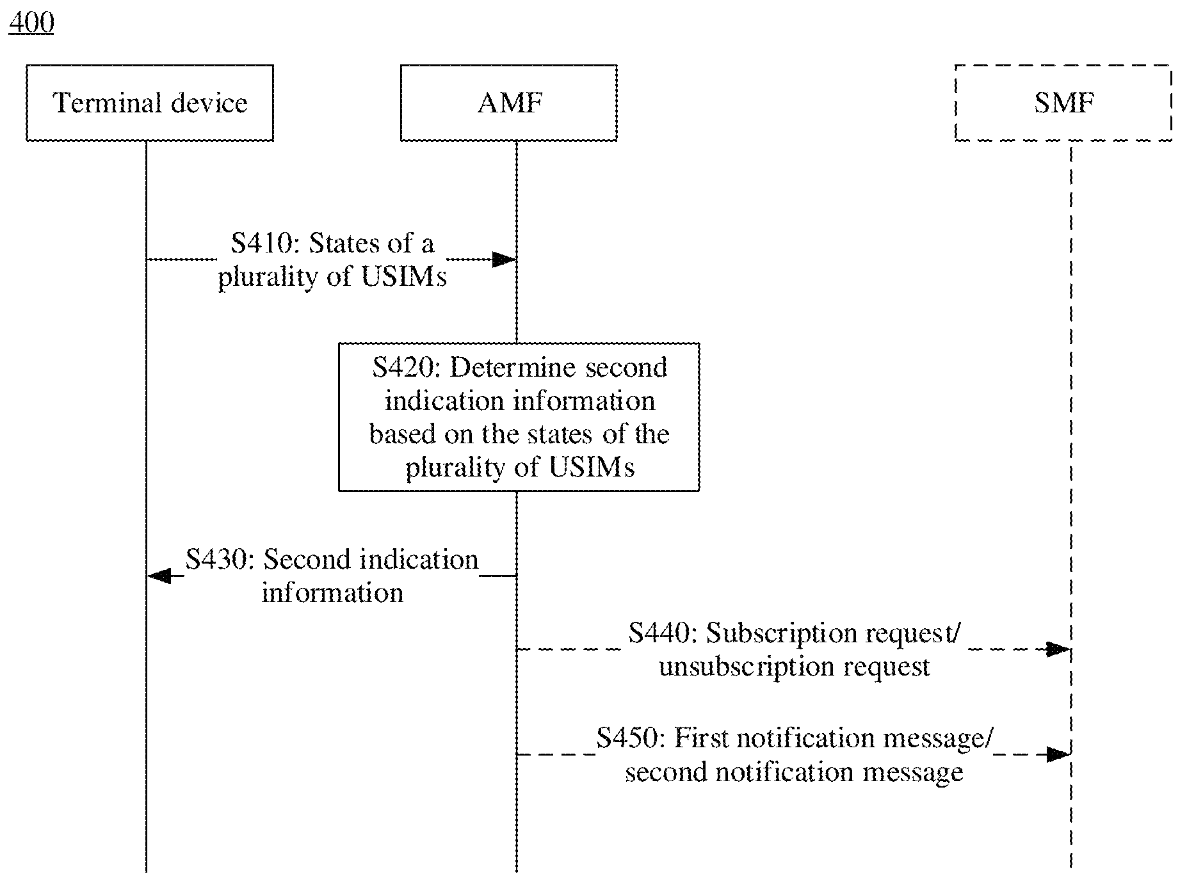
FIG. 4 is a schematic interaction diagram of another communication method according to an embodiment of this application.

FIG. 4 is a schematic diagram of a communication method 400 according to an embodiment of this application. It should be understood that receiving and sending may be performed by including, in a message in an existing standard, content related to receiving and sending in an interaction procedure in FIG. 4. For a specific meaning of the message, refer to descriptions in the standard. Alternatively, receiving and sending may be performed by using a newly defined message. This is not limited in this application. As shown in FIG. 4, the method 400 includes the following steps.

S410: A terminal device sends states of a plurality of USIMs to an access and mobility management function AMF, where the terminal device includes the plurality of USIMs, and the states of the plurality of USIMs are used to determine second indication information.

S420: The AMF determines the second indication information based on the states of the plurality of USIMs, where the second indication information indicates to enable or disable a paging enhancement function, and/or enable or disable a paging occasion collision avoidance function, and the terminal device includes the plurality of USIMs.

Optionally, the paging enhancement function is used to indicate, to the terminal device, service information that triggers paging or filter paging of the terminal device based on service information that triggers paging.

For descriptions of the paging enhancement function and the paging occasion collision avoidance function, refer to descriptions in the method 200. For brevity, details are not described herein again.

Optionally, that the second indication information indicates to enable or disable a paging enhancement function, and/or enable or disable a paging occasion collision avoidance function includes:

the second indication information indicates to enable or disable the paging enhancement function;

the second indication information indicates to enable or disable the paging occasion collision avoidance function;

the second indication information indicates to enable the paging enhancement function and disable the paging occasion collision avoidance function; or the second indication information indicates to disable the paging enhancement function and enable the paging occasion collision avoidance function.

S430: The AMF sends the second indication information to the terminal device. The terminal device receives the second indication information from the AMF.

In this embodiment of this application, the terminal device sends the states of the plurality of USIMs to the AMF, so that the AMF determines to enable or disable the paging enhancement function, and/or enable or disable the paging occasion collision avoidance function. The AMF notifies the terminal device by using the second indication information, so that an MUSIM feature can be flexibly enabled. This helps save network resources.

For the states of the USIMs, refer to the descriptions in the method 200. For brevity, details are not described herein again. The AMF may determine, based on the states of the plurality of USIMs, whether to enable or disable the paging enhancement function, and/or enable or disable the paging occasion collision avoidance function. The following separately provides descriptions.

For the paging enhancement function, the terminal device monitors the states of the plurality of USIMs, and reports the states of the plurality of USIMs to the AMF. The AMF determines, based on the states of the plurality of USIMs, to enable or disable the paging enhancement function. Optionally, the "states of the plurality of USIMs" implicitly include information about a multi-USIM quantity of the terminal device.

(1) In a possible implementation, the second indication information indicates to enable the paging enhancement function. The plurality of USIMs include a first USIM and a second USIM. The first USIM is in a connected state, and the second USIM is in an idle/inactive state. The second USIM may be understood as a current USIM.

For example, it is assumed that a communication capability of the terminal device is 1Tx/1Rx or 1Tx/2Rx. Two USIMs are used as an example. If the first USIM is in the connected state, and the second USIM is in the idle/inactive state, the AMF sets the paging enhancement function to be enabled for the second USIM, and sends the second indication information to the terminal device.

After determining the second indication information that indicates to enable the paging enhancement function, the AMF may send a subscription request to an SMF, to subscribe to the paging enhancement function. Optionally, the method 400 further includes: The AMF sends the subscription request to the session management function SMF, where the subscription request is used to subscribe to the paging enhancement function. Herein, to enable the paging enhancement function, the paging enhancement function may be added to an SMF service in advance, that is, subscription to the paging enhancement function is added. In this way, when determining to enable the paging enhancement function, the AMF can subscribe to the paging enhancement function from the SMF.

The SMF receives the subscription request from the AMF, and enables the paging enhancement function based on the subscription request. The SMF sends a subscription response message to the AMF in response to the subscription request.

Optionally, that the SMF enables the paging enhancement function based on the subscription request includes: The SMF obtains a paging indication of downlink data or signaling, where the paging indication may indicate control plane session management SM signaling, an IMS voice, an IMS short message, an IMS service other than the IMS voice and the IMS short message, a non-IMS service, an application ID, or the like.

Optionally, that the SMF obtains a paging indication of downlink data or signaling includes: The SMF generates the paging indication based on the downlink data or signaling. Alternatively, the SMF indicates a UPF to generate the paging indication based on the downlink data.

Alternatively, after determining the second indication information that indicates to enable the paging enhancement function, the AMF may send a notification to an SMF, to notify the SMF to enable the paging enhancement function. Optionally, the method 400 further includes: The AMF sends a first notification message to the session management function SMF, where the first notification message notifies the SMF to enable the paging enhancement function. Herein, the AMF may notify the SMF to enable the paging enhancement function. Herein, to enable the paging enhancement function, the paging enhancement function may be added to an AMF service in advance, that is, subscription to the paging enhancement function is added. In this way, when the AMF notifies the SMF to enable the paging enhancement function, the SMF can enable the paging enhancement function, that is, subscribe to the paging enhancement function from the AMF.

The SMF receives the first notification message from the AMF, and enables the paging enhancement function based on the first notification message. The SMF sends a first notification response message to the AMF in response to the first notification message.

Optionally, that the SMF enables the paging enhancement function based on the first notification message includes: The SMF obtains a paging indication of downlink data or signaling, where the paging indication may indicate control plane session management SM signaling, an IMS voice, an IMS short message, an IMS service other than the IMS voice and the IMS short message, a non-IMS service, an application ID, or the like.

Optionally, that the SMF obtains a paging indication of downlink data or signaling includes: The SMF generates the paging indication based on the downlink data or signaling. Alternatively, the SMF indicates a UPF to generate the paging indication based on the downlink data.

(2) Optionally, for the paging enhancement function, the second indication information in this embodiment of this application may alternatively be triggered by state transition of a USIM. The "state transition" includes: transition from a connected state to an idle/inactive state, transition from an idle/inactive state to a connected state, or the like. In other words, when a state of one or more of the plurality of USIMs is transited, the AMF determines the second indication information.

In a possible implementation, the second indication information indicates to enable the paging enhancement function. The plurality of USIMs include a first USIM and a second USIM. The first USIM is in a connected state, and the second USIM transits from a connected state to an idle/inactive state. S430 includes: An access and mobility management function AMF of the second USIM sends the second indication information to the terminal device.

In other words, if the first USIM is in the connected state, and the second USIM transits from the connected state to the idle/inactive state through state transition, the access and mobility management function AMF of the second USIM sends the second indication information to the terminal device, to indicate to enable the paging enhancement function.

It may be understood that only an example in which the state of the second USIM is transited is used herein for description. However, this application is not limited thereto. If the state of the first USIM is transited, this application is still applicable.

For behavior of the AMF and an SMF, refer to descriptions in (1). In (2), the AMF refers to the AMF of the second USIM, and the SMF refers to an SMF of the second USIM.

(3) In another possible implementation, the second indication information indicates to disable the paging enhancement function. The plurality of USIMs include a first USIM and a second USIM. The first USIM is in an idle/inactive state, and the second USIM is in an idle/inactive state. The second USIM may be understood as a current USIM.

In other words, it is assumed that a communication capability of the terminal device is 1Tx/1Rx. Two USIMs are used as an example. If the first USIM is in the idle/inactive state, and the second USIM is in the idle/inactive state, the AMF sets the paging enhancement function to be disabled for the second USIM, and sends the second indication information to the terminal device.

After determining the second indication information that indicates to disable the paging enhancement function, the AMF may send an unsubscription request to an SMF, to unsubscribe from the paging enhancement function. Optionally, the method 400 further includes: The AMF sends the unsubscription request to the session management function SMF, where the unsubscription request is used to unsubscribe from the paging enhancement function. Herein, to disable the paging enhancement function, the paging enhancement function may be added to an SMF service in advance, that is, subscription to the paging enhancement function is added. In this way, when determining to disable the paging enhancement function, the AMF can unsubscribe from the paging enhancement function from the SMF.

The SMF receives the unsubscription request from the AMF, and disables the paging enhancement function based on the unsubscription request. The SMF sends an unsubscription response message to the AMF in response to the unsubscription request.

Optionally, that the SMF disables the paging enhancement function based on the unsubscription request includes: The SMF does not obtain a paging indication of downlink data or signaling, where the paging indication may indicate control plane session management SM signaling, an IMS voice, an IMS short message, an IMS service other than the IMS voice and the IMS short message, a non-IMS service, an application ID, or the like.

Optionally, that the SMF does not obtain a paging indication of downlink data or signaling includes: The SMF does not generate the paging indication. Alternatively, the SMF does not indicate a UPF to generate the paging indication based on the downlink data.

Alternatively, the paging indication may be a service indication, service information, or the like.

Alternatively, after determining the second indication information that indicates to disable the paging enhancement function, the AMF may send a notification to an SMF, to notify the SMF to disable the paging enhancement function. Optionally, the method 400 further includes: The AMF sends a second notification message to the session management function SMF, where the second notification message notifies the SMF to disable the paging enhancement function. Herein, the AMF may notify the SMF to disable the paging enhancement function. Herein, to disable the paging enhancement function, the paging enhancement function may be added to an AMF service in advance, that is, subscription to the paging enhancement function is added. In this way, when the AMF notifies the SMF to disable the paging enhancement function, the SMF can disable the paging enhancement function, that is, unsubscribe from the paging enhancement function from the AMF.

The SMF receives the second notification message from the AMF, and disables the paging enhancement function based on the second notification message. The SMF sends a second notification response message to the AMF in response to the second notification message.

Optionally, that the SMF disables the paging enhancement function based on the second notification message includes: The SMF does not obtain a paging indication of downlink data or signaling, where the paging indication may indicate control plane session management SM signaling, an IMS voice, an IMS short message, an IMS service other than the IMS voice and the IMS short message, a non-IMS service, an application ID, or the like.

Optionally, that the SMF does not obtain a paging indication of downlink data or signaling includes: The SMF does not generate the paging indication. Alternatively, the SMF does not indicate a UPF to generate the paging indication based on the downlink data.

Optionally, for the paging enhancement function, the second indication information in this embodiment of this application may alternatively be triggered by state transition of a USIM. The "state transition" includes: transition from a connected state to an idle/inactive state, transition from an idle/inactive state to a connected state, or the like.

(4) In a possible implementation, the second indication information indicates to disable the paging enhancement function. The plurality of USIMs include a first USIM and a second USIM. The first USIM is in an idle/inactive state, and the second USIM transits from a connected state to an idle/inactive state. S430 includes: An access and mobility management function AMF of the second USIM sends the second indication information to the terminal device.

In other words, if the first USIM is in the idle/inactive state, and the second USIM transits from the connected state to the idle/inactive state through state transition, the AMF of the second USIM sends the second indication information to the terminal device, to indicate to disable the paging enhancement function.

It may be understood that only an example in which the state of the second USIM is transited is used herein for description. However, this application is not limited thereto. If the state of the first USIM is transited, this application is still applicable.

For behavior of the AMF and an SMF, refer to descriptions in (3). In (4), the AMF refers to the AMF of the second USIM, and the SMF refers to an SMF of the second USIM.

In another possible implementation, if the terminal device is a single USIM, the AMF may disable the paging enhancement function, and send the second indication information to the AMF, where the second indication information indicates to disable the paging enhancement function.

For a case in which a first function includes the paging occasion collision avoidance function, the terminal device monitors the states of the plurality of USIMs, and sends the states of the plurality of USIMs to the AMF. The AMF determines, based on the states of the plurality of USIMs, to enable or disable the paging occasion collision avoidance function. Optionally, the "states of the plurality of USIMs" implicitly include information about a multi-USIM quantity of the terminal device. Optionally, the AMF may further consider paging occasions of the USIMs, to determine to enable or disable the paging occasion collision avoidance function.

(5) In a possible implementation, the second indication information indicates to enable the paging occasion collision avoidance function. The plurality of USIMs include a first USIM and a second USIM. The first USIM is in an idle/inactive state, and the second USIM is in an idle/inactive state. A paging occasion PO of the first USIM is the same as a PO of the second USIM.

For example, it is assumed that a communication capability of the terminal device is 1Tx/1Rx. Two USIMs are used as an example. If the first USIM is in the idle/inactive state, the second USIM is in the idle/inactive state, and paging occasions of the two USIMs are the same, the AMF sets the paging occasion collision avoidance function to be enabled for the first USIM or the second USIM, and sends the second indication information to the terminal device.

After the AMF determines the second indication information that indicates to enable the paging occasion collision avoidance function, optionally, the method 400 further includes: The AMF performs paging processing based on a first attempt quantity and/or a first paging interval, where the first attempt quantity is greater than a second attempt quantity, the first paging interval is greater than a second paging interval, the second attempt quantity is a quantity of paging attempts of the terminal device before the paging occasion collision avoidance function is enabled, and the second paging interval is a paging interval of the terminal device before the paging occasion collision avoidance function is enabled.

In other words, the AMF may avoid a collision between the paging occasion of the first USIM and the paging occasion of the second USIM by increasing the attempt quantity and/or increasing the paging interval.

Optionally, the method 400 further includes: The AMF sends a paging message to an access network device, where the paging message indicates to enable the paging occasion collision avoidance function. In other words, the AMF may notify the access network device of an indication for enabling the paging occasion collision avoidance function, so that the access network device enhances the paging occasion collision avoidance function. For example, the access network device may prepare two paging occasions for a USIM in one paging cycle, page one USIM of the terminal device on paging occasions in two consecutive paging cycles (for example, DRX cycles), randomize a paging occasion of one USIM, or set a paging occasion offset for one USIM of the terminal device.

Optionally, for the paging occasion collision avoidance function, the second indication information in this embodiment of this application may alternatively be triggered by state transition of a USIM. The "state transition" includes: transition from a connected state to an idle/inactive state, transition from an idle/inactive state to a connected state, or the like.

(6) In a possible implementation, the second indication information indicates to enable the paging occasion collision avoidance function. The plurality of USIMs include a first USIM and a second USIM. The first USIM is in an idle/inactive state, and the second USIM transits from a connected state to an idle/inactive state. A paging occasion PO of the first USIM is the same as a PO of the second USIM. S430 includes: An access and mobility management function AMF of the first USIM or the second USIM sends the second indication information to the terminal device.

In other words, if the first USIM is in the idle/inactive state, the second USIM transits from the connected state to the idle/inactive state through state transition, and the paging occasion PO of the first USIM is the same as the PO of the second USIM, the AMF of the first USIM or the second USIM sends the second indication information to the terminal device, to indicate to enable the paging occasion collision avoidance function.

It may be understood that only an example in which the state of the second USIM is transited is used herein for description. However, this application is not limited thereto. If the state of the first USIM is transited, this application is still applicable.

For behavior of the AMF and an SMF, refer to descriptions in (5). In (6), the AMF refers to the AMF of the first USIM or the second USIM.

(7) In another possible implementation, the second indication information indicates to disable the paging occasion collision avoidance function. The plurality of USIMs include a first USIM and a second USIM. The first USIM is in an idle/inactive state, and the second USIM is in a connected state.

For example, it is assumed that a communication capability of the terminal device is 1Tx/1Rx or 1Tx/2Rx. Two USIMs are used as an example. If the first USIM is in the idle/inactive state, and the second USIM is in the connected state, the AMF sets the paging occasion collision avoidance function to be disabled for the second USIM, and sends the second indication information to the terminal device.

After the AMF determines the second indication information that indicates to disable the paging occasion collision avoidance function, optionally, the method 400 further includes: The AMF performs paging processing based on a second attempt quantity and/or a second paging interval, where the second attempt quantity is less than a first attempt quantity, the second paging interval is less than a first paging interval, the second attempt quantity is a quantity of paging attempts of the terminal device before the paging occasion collision avoidance function is enabled, the second paging interval is a paging interval of the terminal device before the paging occasion collision avoidance function is enabled, the first attempt quantity is a quantity of paging attempts of the terminal device after the paging occasion collision avoidance function is enabled, and the first paging interval is a paging interval of the terminal device after the paging occasion collision avoidance function is enabled.

In other words, the AMF needs to perform additional processing (for example, increase the attempt quantity and/or increase the paging interval), that is, perform normal paging processing for the terminal device.

Optionally, that the AMF disables the paging occasion collision avoidance function includes: The AMF sends a paging message to an access network device, where the paging message indicates to disable the paging occasion collision avoidance function. In other words, the AMF may notify the access network device of an indication for disabling the paging occasion collision avoidance function, so that the access network device does not need to enhance the paging occasion collision avoidance function.

Optionally, for the paging occasion collision avoidance function, the second indication information in this embodiment of this application may alternatively be triggered by state transition of a USIM. The "state transition" includes: transition from a connected state to an idle/inactive state, transition from an idle/inactive state to a connected state, or the like.

(8) In a possible implementation, the second indication information indicates to disable the paging occasion collision avoidance function. The plurality of USIMs include a first USIM and a second USIM. The first USIM is in an idle/inactive state, and the second USIM transits from an idle/inactive state to a connected state. S430 includes: An access and mobility management function AMF of the first USIM sends the second indication information to the terminal device.

In other words, if the first USIM is in the idle/inactive state, and the second USIM transits from the idle/inactive state to the connected state through state transition, the AMF of the first USIM sends the second indication information to the terminal device, to indicate to disable the paging occasion collision avoidance function.

It may be understood that only an example in which the state of the second USIM is transited is used herein for description. However, this application is not limited thereto. If the state of the first USIM is transited, this application is still applicable.

For behavior of the AMF and an SMF, refer to descriptions in (7). In (8), the AMF refers to the AMF of the first USIM.

In another possible implementation, if the terminal device is a single USIM, the AMF may disable the paging occasion collision avoidance function, and send the second indication information to the terminal device, where the second indication information indicates to disable the paging occasion collision avoidance function.

According to the states of the two USIMs, the paging occasion collision avoidance function and the paging enhancement function are mutually exclusive. In this case, actually, one piece of indication information may indicate to enable one feature and disable the other feature. The following provides detailed descriptions.

Optionally, the second indication information may indicate to enable the paging occasion collision avoidance function and disable the paging enhancement function, or indicate to disable the paging occasion collision avoidance function and enable the paging enhancement function.

(9) In a possible implementation, the second indication information indicates to enable the paging occasion collision avoidance function and disable the paging enhancement function. The plurality of USIMs include a first USIM and a second USIM. The first USIM is in an idle/inactive state, and the second USIM is in an idle/inactive state. S430 includes: An access and mobility management function AMF of the first USIM or the second USIM sends the second indication information to the terminal device.

Optionally, the second indication information indicates to enable the paging occasion collision avoidance function and disable the paging enhancement function. The plurality of USIMs include a first USIM and a second USIM. The first USIM is in an idle/inactive state, and the second USIM transits from a connected state to an idle/inactive state. The terminal device sends the second indication information to an access and mobility management function AMF of the second USIM.

(10) In another possible implementation, the second indication information indicates to disable the paging occasion collision avoidance function and enable the paging enhancement function. The plurality of USIMs include a first USIM and a second USIM. The first USIM is in an idle/inactive state, and the second USIM is in a connected state. S430 includes: An access and mobility management function AMF of the first USIM sends the second indication information to the terminal device.

Optionally, the second indication indicates to disable the paging occasion collision avoidance function and enable the paging enhancement function. The plurality of USIMs include a first USIM and a second USIM. The first USIM is in an idle/inactive state, and the second USIM transits from an idle/inactive state to a connected state. The terminal device sends the second indication information to an access and mobility management function AMF of the first USIM.

Figure 5:
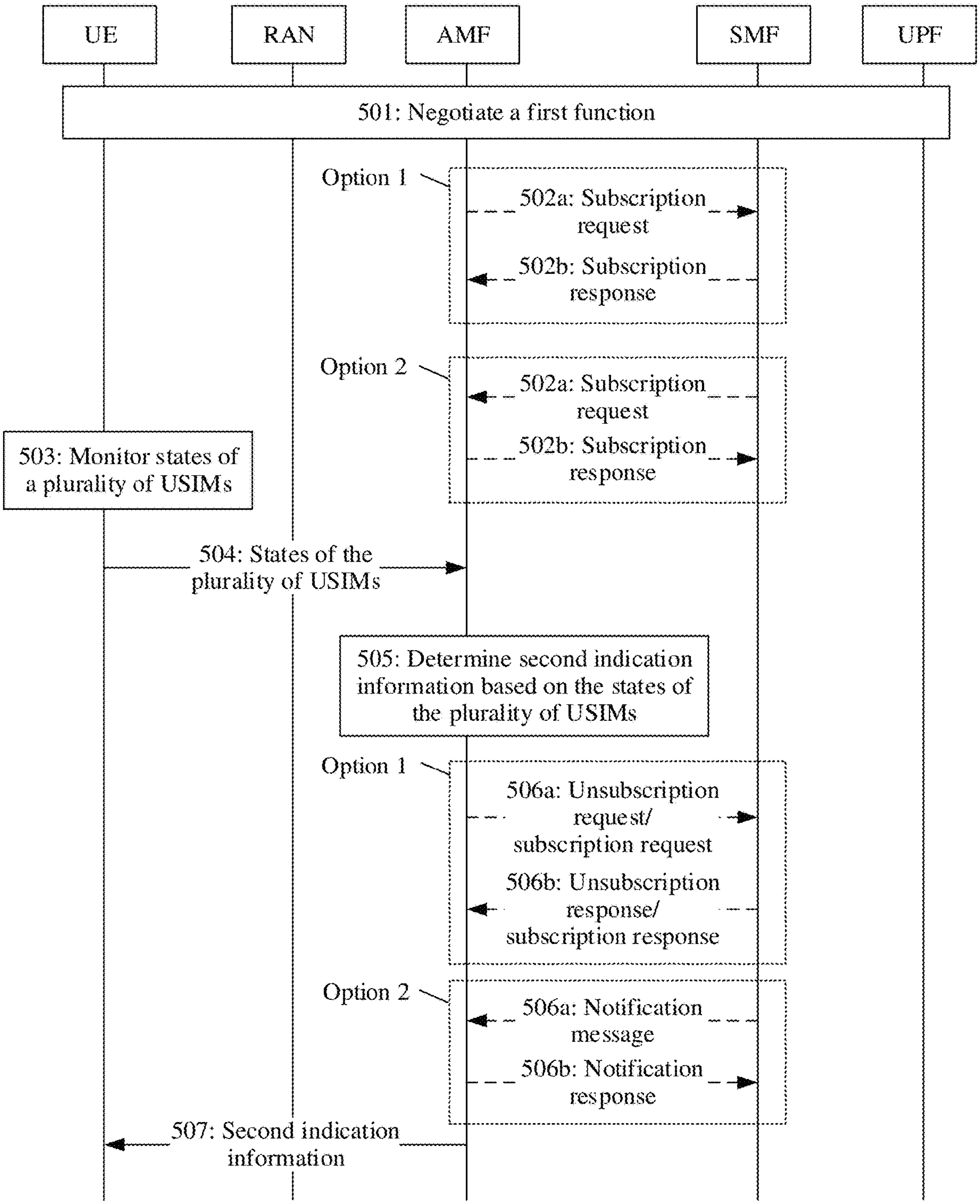
FIG. 5 is a schematic diagram of an example of another communication method according to an embodiment of this application.

For ease of understanding, descriptions are provided below with reference to an example in FIG. 5. It is assumed that the first function includes an MUSIM paging enhancement feature (or referred to as a paging enhancement function). As shown in FIG. 5, the procedure includes the following steps.

501: Negotiate the first function.

For example, the first function includes the MUSIM paging enhancement feature (or referred to as the paging enhancement function). For a terminal device having an MUSIM capability, UE (for example, a USIM 1), an AMF, an SMF, and a UPF negotiate the MUSIM paging enhancement feature, namely, paging enhancement triggered by a downlink service. The paging enhancement function may specifically include: The SMF/UPF or the AMF detects downlink data or signaling of the USIM 1, to obtain corresponding service information, for example, a service type (service type). The AMF sends a paging message including the service information to a RAN node. The RAN node further indicates the paging message including the service information to the UE. Alternatively, the AMF notifies the UE of downlink service information by using a NAS message or user plane data, so that the UE can determine, based on the downlink service information of the USIM 1, whether to continue to perform a service of a USIM (for example, a USIM 2) that is currently in a connected state or transit to perform a service of the USIM 1. Before the UE receives the downlink service information of the USIM 1, the USIM 2 is in the connected state.

Another optional paging enhancement may specifically include: being used to filter paging of the terminal device based on service information that triggers paging. The UE reports service information desired by a USIM to the AMF, for example, through a registration procedure or a service request procedure. The AMF stores the service information. When the USIM in an idle state has a downlink service, the AMF determines, based on service information of the downlink service and the service information, whether to send a paging message to the terminal device or send downlink service information to the UE by using a NAS message or user plane data. For example, the service information reported by the terminal device is an allowlist. In this case, if the service information that triggers paging is in the allowlist, the AMF sends the paging message to the terminal device, or sends the downlink service information to the UE by using the NAS message or the user plane data; or if the service information that triggers paging is not in the allowlist, the AMF neither sends the paging message to the terminal device, nor sends the downlink service information to the UE by using the NAS message or the user plane data. The service information reported by the terminal device is a blocklist. In this case, if the service information that triggers paging is in the blocklist, the AMF neither sends the paging message to the terminal device, nor sends the downlink service information to the UE by using the NAS message or the user plane data; or if the service information that triggers paging is not in the blocklist, the AMF sends the paging message to the terminal device, or sends the downlink service information to the UE by using the NAS message or the user plane data.

Optionally, 502: Add a service for subscribing to the MUSIM paging enhancement feature.

After the MUSIM paging enhancement feature is negotiated, to flexibly and dynamically enable or disable a corresponding MUSIM feature, two services can be added during subscription to the MUSIM feature between the AMF and SMF.

Option 1: Subscription to the MUSIM feature is added to an SMF service. In this way, when determining that the MUSIM feature is transited from being enabled to being disabled or the MUSIM feature is transited from being disabled to being enabled, the AMF may subscribe to or unsubscribe from an MUSIM service of the AMF from the SMF.

502*a*: The AMF sends a subscription request to the SMF, to subscribe to the service and enable the MUSIM paging enhancement feature. 502*b*: The SMF sends a subscription response to the AMF.

Option 2: Subscription to the MUSIM paging enhancement feature is added to an AMF service. 502*a*: The SMF sends a subscription request to the AMF, to subscribe to the MUSIM paging enhancement feature. That is, the SMF is notified when the paging enhancement feature needs to be enabled or disabled for the MUSIM UE, so that the SMF determines whether to obtain a paging cause based on the downlink data. 502*b*: The AMF sends a subscription response to the SMF. In this way, when determining that the MUSIM feature is transited from being enabled to being disabled or the MUSIM feature is transited from being disabled to being enabled, the AMF may notify the SMF.

503: The UE monitors states of a plurality of USIMs.

Optionally, the UE monitors a multi-USIM quantity and a multi-USIM state, and reports the multi-USIM quantity and the multi-USIM state to the AMF in a timely manner, so that the AMF makes a decision on enabling or disabling the MUSIM paging enhancement feature.

504: The UE sends the states of the plurality of USIMs to the AMF.

For example, the UE sends a request message to the AMF, where the request message carries the states of the plurality of USIMs. Optionally, the request message may be a registration request or a service request message, or may be a UL NAS transport message or another NAS message after the UE (USIM) enters the connected state.

505: The AMF determines second indication information based on the states of the plurality of USIMs.

For example, the AMF determines, based on a multi-USIM capability, the multi-USIM quantity, and the multi-USIM state of the UE, whether a network needs to enable the MUSIM paging enhancement feature. The second indication information indicates to enable or disable the MUSIM paging enhancement feature. The AMF may further determine an SMF network element that needs to be contacted. The AMF may notify SMFs corresponding to all established PDU sessions of the USIM, or notify only an SMF corresponding to a part of established PDU sessions of the USIM (for example, the MUSIM paging enhancement feature is enabled only for specific NSSAI and/or a specific DN).

Herein, for a manner in which the AMF determines the second indication information, refer to the foregoing descriptions. Details are not described herein again.

The AMF needs to notify the SMF of transition of the MUSIM paging enhancement feature from being enabled to being disabled or transition of the MUSIM paging enhancement feature from being disabled to being enabled.

Optionally, corresponding to option 1 in 502, in 506*a*, the AMF sends an unsubscription request to the SMF; and in 506*b*, the SMF sends an unsubscription response to the AMF.

Optionally, corresponding to option 2 in 502, in 506*a*, the AMF sends a notification message to the SMF; and in 506*b*, the SMF sends a notification response to the AMF.

507: The AMF returns the second indication information to the UE.

The following uses an example in which a first function includes an MUSIM paging collision avoidance feature for description. As shown in FIG. 5, the following steps are included.

501: Negotiate the first function.

For example, the first function includes the MUSIM paging collision avoidance feature (or referred to as a paging occasion collision avoidance function). UE and an AMF negotiate the MUSIM paging collision avoidance feature, that is, when paging is triggered by a downlink service, the following operation may be performed. For example, during paging policy enhancement, when paging is triggered by downlink data or signaling, the AMF or a RAN increases a quantity of UE (namely, USIM) paging attempts, and prolongs a paging interval between every two times of paging. For another example, the AMF indicates the paging collision avoidance feature in a paging message to a RAN, so that the RAN generates (or calculates) enhancement of a PO, for example, prepares two POs for one USIM of the UE in one paging cycle (for example, a DRX cycle), pages one USIM of a terminal device on paging occasions in two consecutive paging cycles (for example, DRX cycles), randomizes a paging occasion of one USIM, or sets a paging occasion offset for one USIM of a terminal device.

503: The UE monitors states of a plurality of USIMs.

Optionally, the UE detects a multi-USIM state and a PO of a USIM, and reports the multi-USIM state and the PO of the USIM to the AMF in a timely manner, so that the AMF determines, based on states of two USIMs and depending on whether current POs of the two USIMs are the same (where POs of the UE in different cells may be different), whether a network needs to enable the MUSIM paging collision avoidance feature.

505: The AMF determines second indication information based on the states of the plurality of USIMs.

For example, the AMF determines, based on the second indication information, that the MUSIM paging occasion collision avoidance feature needs to be enabled or disabled. In this case, when UE paging is triggered subsequently by the downlink data or signaling, the AMF performs the following operation: not performing paging policy enhancement, that is, performing common UE paging processing, or indicating/not indicating paging conflict avoidance in the paging message to the RAN.

Herein, for a manner in which the AMF determines the second indication information, refer to the foregoing descriptions. Details are not described herein again.

507: The AMF sends the second indication information to the UE.

It may be understood that the foregoing example in FIG. 3 or FIG. 5 is merely an example for description, and does not constitute a limitation on this embodiment of this application.

It may be understood that various possible implementations of the second indication information are applicable to the procedure in FIG. 5. In FIG. 5, only a part of implementations is used as an example for description. Actually, an implementation of the second indication information that is not listed is also applicable to FIG. 5. For example, in FIG. 5, the second indication information indicates to enable the paging enhancement function and disable the paging occasion collision avoidance function; or the second indication information indicates to disable the paging enhancement function and enable the paging occasion collision avoidance function.

It should be understood that sequence numbers of the processes do not mean an execution sequence in the foregoing embodiments. The execution sequence of the processes should be determined according to functions and internal logic of the processes, and should not be construed as any limitation on the implementation processes of embodiments of this application.

The methods provided in embodiments of this application are described in detail above with reference to FIG. 1 to FIG. 5. Apparatuses provided in embodiments of this application are described in detail below with reference to FIG. 6 to FIG. 8.

Figure 6:
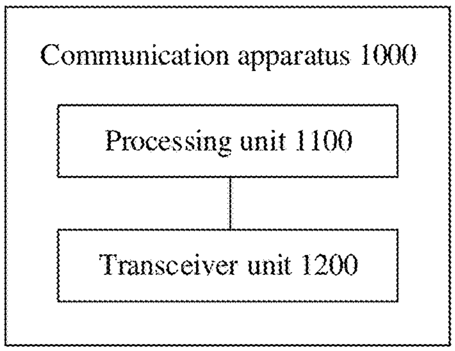
FIG. 6 is a schematic block diagram of a communication apparatus according to an embodiment of this application.

FIG. 6 is a schematic block diagram of a communication apparatus according to an embodiment of this application. As shown in FIG. 6, the communication apparatus 1000 may include a processing unit 1100 and a transceiver unit 1200.

In a possible design, the communication apparatus 1000 may correspond to the terminal device in the foregoing method embodiments, for example, may be a terminal device, or a component (for example, a chip or a circuit) disposed in the terminal device.

Optionally, the communication apparatus 1000 may correspond to the terminal device in the methods according to embodiments of this application, and the communication apparatus 1000 may include units configured to perform the method performed by the terminal device in the foregoing method 200. In addition, the units in the communication apparatus 1000 and the foregoing other operations and/or functions are separately intended to implement corresponding procedures of the method 200 in FIG. 2.

Specifically, the processing unit 1100 is configured to determine first indication information based on states of a plurality of universal subscriber identity modules USIMs, where the first indication information indicates to enable or disable a paging enhancement function, and/or enable or disable a paging occasion collision avoidance function, and the terminal device includes the plurality of USIMs. The transceiver unit 1200 is configured to send the first indication information to an access and mobility management function AMF.

Optionally, the paging enhancement function is used to indicate, to the terminal device, service information that triggers paging or filter paging of the terminal device based on service information that triggers paging.

Optionally, that the first indication information indicates to enable or disable a paging enhancement function, and/or enable or disable a paging occasion collision avoidance function includes:

- the first indication information indicates to enable or disable the paging enhancement function;
- the first indication information indicates to enable or disable the paging occasion collision avoidance function;
- the first indication information indicates to enable the paging enhancement function and disable the paging occasion collision avoidance function; or the first indication information indicates to disable the paging enhancement function and enable the paging occasion collision avoidance function.

Optionally, the first indication information indicates to enable the paging enhancement function. The plurality of USIMs include a first USIM and a second USIM. The first USIM is in a connected state, and the second USIM is in an idle/inactive state. That the transceiver unit 1200 is configured to send the first indication information to an AMF includes: sending the first indication information to an AMF corresponding to the second USIM.

Optionally, the first indication information indicates to disable the paging enhancement function. The plurality of USIMs include a first USIM and a second USIM. The first USIM is in an idle/inactive state, and the second USIM is in an idle/inactive state. That the transceiver unit 1200 is configured to send the first indication information to an AMF includes: sending the first indication information to an AMF corresponding to the first USIM and/or an AMF corresponding to the second USIM.

Optionally, the first indication information indicates to enable the paging occasion collision avoidance function. The plurality of USIMs include a first USIM and a second USIM. The first USIM is in an idle/inactive state, and the second USIM is in an idle/inactive state. A paging occasion PO of the first USIM is the same as a PO of the second USIM. That the transceiver unit 1200 is configured to send the first indication information to an AMF includes: sending the first indication information to an AMF corresponding to the first USIM or an AMF corresponding to the second USIM.

Optionally, the first indication information indicates to disable the paging occasion collision avoidance function. The plurality of USIMs include a first USIM and a second USIM. The first USIM is in an idle/inactive state, and the second USIM is in a connected state. That the transceiver unit 1200 is configured to send the first indication information to an AMF includes: sending the first indication information to an AMF corresponding to the first USIM.

Optionally, the first indication indicates to enable the paging occasion collision avoidance function and disable the paging enhancement function. The plurality of USIMs include a first USIM and a second USIM. The first USIM is in an idle/inactive state, and the second USIM is in an idle/inactive state. That the transceiver unit 1200 is configured to send the first indication information to an access and mobility management function AMF includes: sending the first indication information to an AMF corresponding to the first USIM or an AMF corresponding to the second USIM.

Optionally, the first indication indicates to disable the paging occasion collision avoidance function and enable the paging enhancement function. The plurality of USIMs include a first USIM and a second USIM. The first USIM is in an idle/inactive state, and the second USIM is in a connected state. That the transceiver unit 1200 is configured to send the first indication information to an AMF includes: sending the first indication information to an AMF corresponding to the first USIM.

It should be understood that the transceiver unit 1200 may be configured to perform receiving and/or sending steps of the terminal device in the method 200 (or the UE in FIG. 3). For brevity, examples are not listed one by one herein.

Optionally, the communication apparatus 1000 may correspond to the terminal device in the methods according to embodiments of this application, and the communication apparatus 1000 may include units configured to perform the method performed by the terminal device in the foregoing method 400. In addition, the units in the communication apparatus 1000 and the foregoing other operations and/or functions are separately intended to implement corresponding procedures of the terminal device in the method 400 in FIG. 4.

Specifically, the processing unit 1100 is configured to send states of a plurality of USIMs to an access and mobility management function AMF, where the terminal device includes the plurality of USIMs, and the states of the plurality of USIMs are used to determine second indication information. The transceiver unit 1200 is configured to receive the second indication information from the AMF, where the second indication information indicates to enable or disable a paging enhancement function, and/or enable or disable a paging occasion collision avoidance function.

Optionally, the paging enhancement function is used to indicate, to the terminal device, service information that triggers paging or filter paging of the terminal device based on service information that triggers paging.

Optionally, that the second indication information indicates to enable or disable a paging enhancement function, and/or enable or disable a paging occasion collision avoidance function includes:

- the second indication information indicates to enable or disable the paging enhancement function;
- the second indication information indicates to enable or disable the paging occasion collision avoidance function;
- the second indication information indicates to enable the paging enhancement function and disable the paging occasion collision avoidance function; or the second indication information indicates to disable the paging enhancement function and enable the paging occasion collision avoidance function.

Optionally, the second indication information indicates to enable the paging enhancement function. The plurality of USIMs include a first USIM and a second USIM. The first USIM is in a connected state, and the second USIM is in an idle/inactive state.

Optionally, the second indication information indicates to disable the paging enhancement function. The plurality of USIMs include a first USIM and a second USIM. The first USIM is in an idle/inactive state, and the second USIM is in an idle/inactive state.

Optionally, the second indication information indicates to enable the paging occasion collision avoidance function. The plurality of USIMs include a first USIM and a second USIM. The first USIM is in an idle/inactive state, and the second USIM is in an idle/inactive state. A paging occasion PO of the first USIM is the same as a PO of the second USIM.

Optionally, the second indication information indicates to disable the paging occasion collision avoidance function. The plurality of USIMs include a first USIM and a second USIM. The first USIM is in an idle/inactive state, and the second USIM is in a connected state.

Optionally, the second indication information indicates to enable the paging occasion collision avoidance function and disable the paging enhancement function. The plurality of USIMs include a first USIM and a second USIM. The first USIM is in an idle/inactive state, and the second USIM is in an idle/inactive state. The AMF is an AMF corresponding to the first USIM or an AMF corresponding to the second USIM.

Optionally, the second indication information indicates to disable the paging occasion collision avoidance function and enable the paging enhancement function. The plurality of USIMs include a first USIM and a second USIM. The first USIM is in an idle/inactive state, and the second USIM is in a connected state. The AMF is an AMF corresponding to the first USIM.

It should be understood that the transceiver unit 1200 may be configured to perform receiving and/or sending steps of the terminal device in the method 400 (or the UE in FIG. 5). For brevity, examples are not listed one by one herein.

Figure 7:
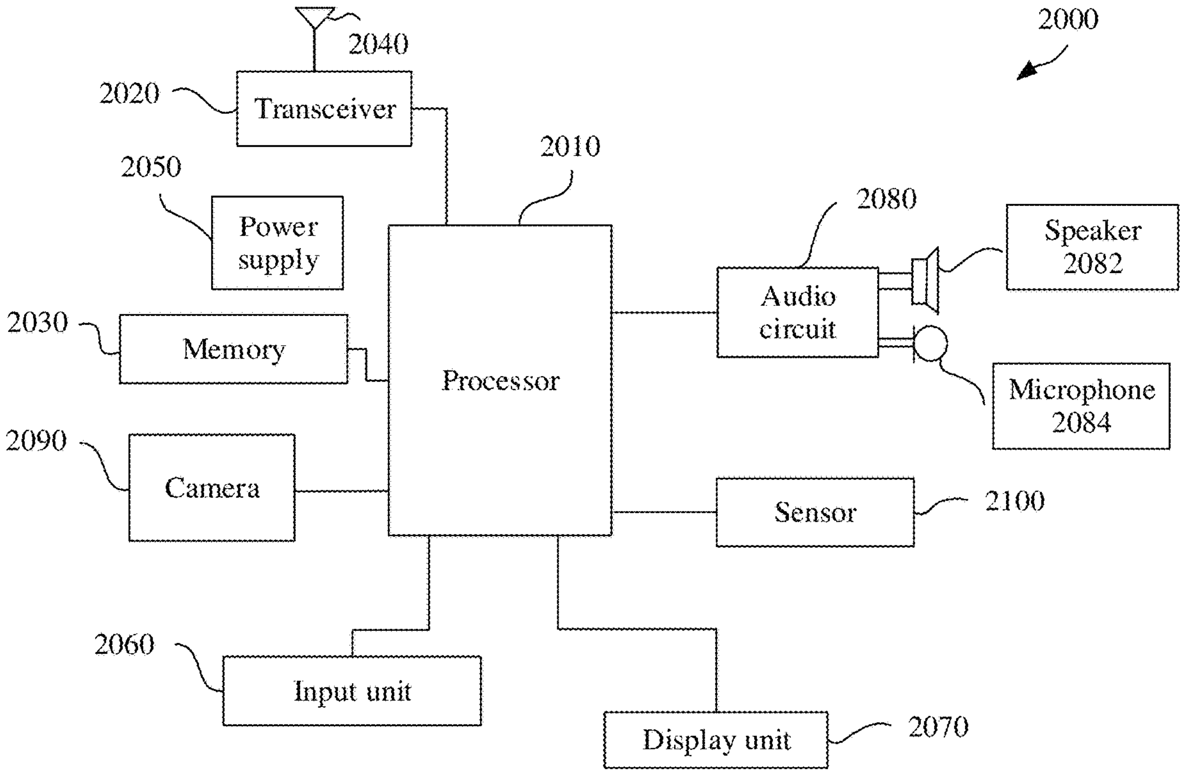
FIG. 7 is a schematic diagram of a structure of a communication apparatus according to an embodiment of this application.

It should be further understood that, when the communication apparatus 1000 is the terminal device, the transceiver unit 1200 in the communication apparatus 1000 may be implemented through a transceiver, for example, may correspond to a transceiver 2020 in a terminal device 2000 shown in FIG. 7; and the processing unit 1100 in the communication apparatus 1000 may be implemented through at least one processor, for example, may correspond to a processor 2010 in the terminal device 2000 shown in FIG. 7.

It should further be understood that, when the communication apparatus 1000 is a chip in the terminal device, the transceiver unit 1200 in the communication apparatus 1000 may be implemented through an input/output interface.

Optionally, the communication apparatus 1000 further includes a storage unit. The storage unit may be configured to store instructions or data. The processing unit may invoke the instructions or the data stored in the storage unit, to implement a corresponding operation. The storage unit may be implemented through at least one memory, for example, may correspond to a memory 2030 in the terminal device 2000 in FIG. 7.

In another possible design, the communication apparatus 1000 may correspond to the AMF in the foregoing method embodiments, for example, may be an AMF, or a component (for example, a chip or a circuit) disposed in the AMF.

Optionally, the communication apparatus 1000 may correspond to the AMF in the methods according to embodiments of this application, and the communication apparatus 1000 may include units configured to perform the method performed by the AMF in the foregoing method 200. In addition, the units in the communication apparatus 1000 and the foregoing other operations and/or functions are separately intended to implement corresponding procedures of the method 200 in FIG. 2.

Specifically, the transceiver unit 1200 is configured to receive first indication information from a terminal device, where the terminal device includes a plurality of USIMs, and the first indication information is determined based on states of the plurality of USIMs. The processing unit 1100 is configured to: enable or disable a paging enhancement function based on the first indication information; and/or enable or disable a paging occasion collision avoidance function based on the first indication information.

Optionally, the paging enhancement function is used to indicate, to the terminal device, service information that triggers paging or filter paging of the terminal device based on service information that triggers paging.

Optionally, that the first indication information indicates to enable or disable the paging enhancement function, and/or enable or disable the paging occasion collision avoidance function includes:

the first indication information indicates to enable or disable the paging enhancement function;

the first indication information indicates to enable or disable the paging occasion collision avoidance function;

the first indication information indicates to enable the paging enhancement function and disable the paging occasion collision avoidance function; or the first indication information indicates to disable the paging enhancement function and enable the paging occasion collision avoidance function.

Optionally, the first indication information indicates to enable the paging enhancement function. The plurality of USIMs include a first USIM and a second USIM. The first USIM is in a connected state, and the second USIM is in an idle/inactive state. The AMF is an AMF corresponding to the second USIM.

Optionally, the transceiver unit 1200 is further configured to send a subscription request to a session management function SMF of the second USIM, where the subscription request is used to subscribe to the paging enhancement function.

Optionally, the transceiver unit 1200 is further configured to send a first notification message to an SMF of the second USIM, where the first notification message notifies the SMF to enable the paging enhancement function.

Optionally, the first indication information indicates to disable the paging enhancement function. The plurality of USIMs include a first USIM and a second USIM. The first USIM is in an idle/inactive state, and the second USIM is in an idle/inactive state. The AMF is an AMF corresponding to the first USIM and/or an AMF corresponding to the second USIM.

Optionally, the transceiver unit 1200 is further configured to send an unsubscription request to an SMF of the second USIM, where the unsubscription request is used to unsubscribe from the paging enhancement function.

Optionally, the transceiver unit 1200 is further configured to send a second notification message to an SMF corresponding to the first USIM or an SMF corresponding to the second USIM, where the second notification message notifies the SMF to disable the paging enhancement function.

Optionally, the first indication information indicates to enable the paging occasion collision avoidance function. The plurality of USIMs include a first USIM and a second USIM. The first USIM is in an idle/inactive state, and the second USIM is in an idle/inactive state. A paging occasion PO of the first USIM is the same as a PO of the second USIM. The AMF is an AMF corresponding to the first USIM or an AMF corresponding to the second USIM.

Optionally, that the processing unit 1100 is configured to enable the paging occasion collision avoidance function includes: performing paging processing based on a first attempt quantity and/or a first paging interval, where the first attempt quantity is greater than a second attempt quantity, the first paging interval is greater than a second paging interval, the second attempt quantity is a quantity of paging attempts of the terminal device before the paging occasion collision avoidance function is enabled, and the second paging interval is a paging interval of the terminal device before the paging occasion collision avoidance function is enabled.

Optionally, when enabling the paging occasion collision avoidance function, the transceiver unit 1200 is further configured to send a paging message to an access network device, where the paging message indicates to enable the paging occasion collision avoidance function.

Optionally, the first indication information indicates to disable the paging occasion collision avoidance function. The plurality of USIMs include a first USIM and a second USIM. The first USIM is in an idle/inactive state, and the second USIM is in a connected state. The AMF is an AMF corresponding to the first USIM.

The disabling the paging occasion collision avoidance function includes: The processing unit 1100 is further configured to perform paging processing based on a second attempt quantity and/or a second paging interval, where the second attempt quantity is less than a first attempt quantity, the second paging interval is less than a first paging interval, the second attempt quantity is a quantity of paging attempts of the terminal device before the paging occasion collision avoidance function is enabled, the second paging interval is a paging interval of the terminal device before the paging occasion collision avoidance function is enabled, the first attempt quantity is a quantity of paging attempts of the terminal device after the paging occasion collision avoidance function is enabled, and the first paging interval is a paging interval of the terminal device after the paging occasion collision avoidance function is enabled.

Optionally, when disabling the paging occasion collision avoidance function, the transceiver unit 1200 is further configured to send a paging message to an access network device, where the paging message indicates to disable the paging occasion collision avoidance function.

Optionally, the first indication indicates to enable the paging occasion collision avoidance function and disable the paging enhancement function. The plurality of USIMs include a first USIM and a second USIM. The first USIM is in an idle/inactive state, and the second USIM is in an idle/inactive state. The AMF is an AMF corresponding to the first USIM or an AMF corresponding to the second USIM.

Optionally, the first indication indicates to disable the paging occasion collision avoidance function and enable the paging enhancement function. The plurality of USIMs include a first USIM and a second USIM. The first USIM is in an idle/inactive state, and the second USIM is in a connected state. The AMF is an AMF corresponding to the first USIM.

It should be understood that the transceiver unit 1200 may be configured to perform receiving and/or sending steps of the AMF in the method 400 (or the AMF in FIG. 3). For brevity, examples are not listed one by one herein.

Optionally, the communication apparatus 1000 may correspond to the AMF in the methods according to embodiments of this application, and the communication apparatus 1000 may include units configured to perform the method performed by the AMF in the foregoing method 400. In addition, the units in the communication apparatus 1000 and the foregoing other operations and/or functions are separately intended to implement corresponding procedures of the method 400 in FIG. 4.

Specifically, the transceiver unit 1200 is configured to receive states of a plurality of USIMs from a terminal device. The processing unit 1100 is configured to determine second indication information based on the states of the plurality of USIMs, where the second indication information indicates to enable or disable a paging enhancement function, and/or enable or disable a paging occasion collision avoidance function, and the terminal device includes the plurality of USIMs. The transceiver unit 1200 is further configured to send the second indication information to the terminal device.

Optionally, the paging enhancement function is used to indicate, to the terminal device, service information that triggers paging or filter paging of the terminal device based on service information that triggers paging.

Optionally, that the second indication information indicates to enable or disable a paging enhancement function, and/or enable or disable a paging occasion collision avoidance function includes:

the second indication information indicates to enable or disable the paging enhancement function;

the second indication information indicates to enable or disable the paging occasion collision avoidance function;

the second indication information indicates to enable the paging enhancement function and disable the paging occasion collision avoidance function; or the second indication information indicates to disable the paging enhancement function and enable the paging occasion collision avoidance function.

Optionally, the second indication information indicates to enable the paging enhancement function. The plurality of USIMs include a first USIM and a second USIM. The first USIM is in a connected state, and the second USIM is in an idle/inactive state.

Optionally, the transceiver unit 1200 is further configured to send a subscription request to a session management function SMF corresponding to the second USIM, where the subscription request is used to subscribe to the paging enhancement function.

Optionally, the transceiver unit 1200 is further configured to send a first notification message to a session management function SMF corresponding to the second USIM, where the first notification message notifies the SMF to enable the paging enhancement function.

Optionally, the second indication information indicates to disable the paging enhancement function. The plurality of USIMs include a first USIM and a second USIM. The first USIM is in an idle/inactive state, and the second USIM is in an idle/inactive state.

Optionally, the transceiver unit 1200 is further configured to send an unsubscription request to an SMF corresponding to the second USIM, where the unsubscription request is used to unsubscribe from the paging enhancement function.

Optionally, the transceiver unit 1200 is further configured to send a second notification message to a session management function SMF corresponding to the second USIM, where the second notification message notifies the SMF to disable the paging enhancement function.

Optionally, the second indication information indicates to enable the paging occasion collision avoidance function. The plurality of USIMs include a first USIM and a second USIM. The first USIM is in an idle/inactive state, and the second USIM is in an idle/inactive state. The second indication information further includes a paging occasion PO of the first USIM and a PO of the second USIM. The PO of the first USIM is the same as the PO of the second USIM.

Optionally, the processing unit 1100 is further configured to perform paging processing based on a first attempt quantity and/or a first paging interval, where the first attempt quantity is greater than a second attempt quantity, the first paging interval is greater than a second paging interval, the second attempt quantity is a quantity of paging attempts of the terminal device before the paging occasion collision avoidance function is enabled, and the second paging interval is a paging interval of the terminal device before the paging occasion collision avoidance function is enabled.

Optionally, the transceiver unit 1200 is further configured to send a paging message to an access network device, where the paging message indicates to enable the paging occasion collision avoidance function.

Optionally, the second indication information indicates to disable the paging occasion collision avoidance function. The plurality of USIMs include a first USIM and a second USIM. The first USIM is in an idle/inactive state, and the second USIM is in a connected state.

Optionally, the processing unit 1100 is further configured to perform paging processing based on a second attempt quantity and/or a second paging interval, where the second attempt quantity is a quantity of paging attempts of the terminal device before the paging occasion collision avoidance function is enabled, and the second paging interval is a paging interval of the terminal device before the paging occasion collision avoidance function is enabled.

Optionally, the transceiver unit 1200 is further configured to send a paging message to an access network device, where the paging message indicates to disable the paging occasion collision avoidance function.

Optionally, the first indication indicates to enable the paging occasion collision avoidance function and disable the paging enhancement function. The plurality of USIMs include a first USIM and a second USIM. The first USIM is in an idle/inactive state, and the second USIM is in an idle/inactive state.

Optionally, the first indication indicates to disable the paging occasion collision avoidance function and enable the paging enhancement function. The plurality of USIMs include a first USIM and a second USIM. The first USIM is in an idle/inactive state, and the second USIM is in a connected state.

It should be understood that the transceiver unit 1200 may be configured to perform receiving and/or sending steps of the AMF in the method 400 (or the AMF in FIG. 5). For brevity, examples are not listed one by one herein.

Figure 8:
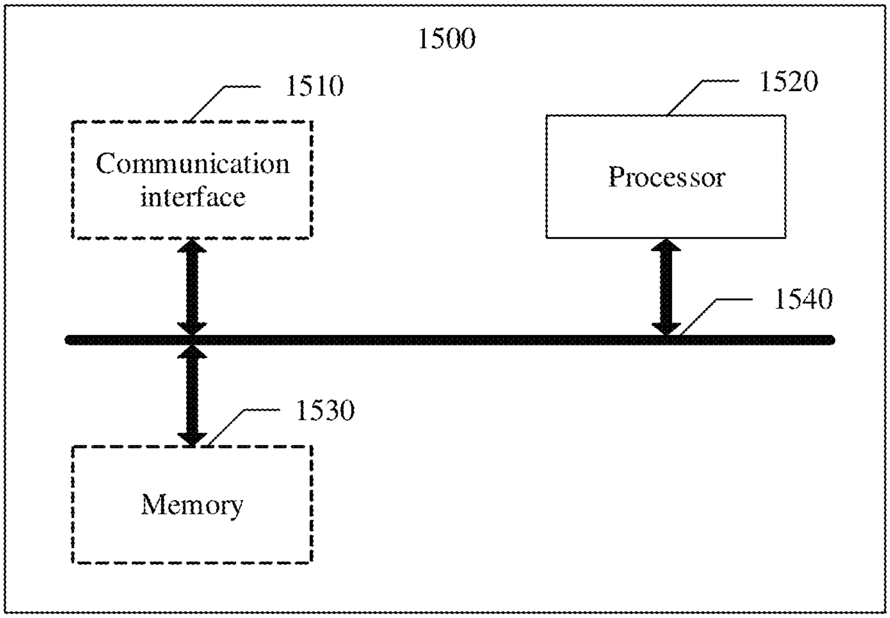
FIG. 8 is a schematic diagram of another structure of a communication apparatus according to an embodiment of this application.

It should be further understood that, when the communication apparatus 1000 is the AMF, the transceiver unit 1200 in the communication apparatus 1000 may be implemented through a transceiver, for example, may correspond to a communication interface 1510 shown in FIG. 8; and the processing unit 1100 in the communication apparatus 1000 may be implemented through at least one processor, for example, may correspond to a processor 1520 shown in FIG. 8.

It should further be understood that, when the communication apparatus 1000 is a chip in the AMF, the transceiver unit 1200 in the communication apparatus 1000 may be implemented through an input/output interface.

Optionally, the communication apparatus 1000 further includes a storage unit. The storage unit may be configured to store instructions or data. The processing unit may invoke the instructions or the data stored in the storage unit, to implement a corresponding operation. The storage unit may be implemented through at least one memory, for example, may correspond to a memory 1530 in FIG. 8.

FIG. 7 is a schematic diagram of a structure of a terminal device 2000 according to an embodiment of this application. The terminal device 2000 may be used in the system shown in FIG. 1, to perform functions of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 2002, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030, to implement the foregoing functions. During specific implementation, the memory 2030 may alternatively be integrated into the processor 2010, or may be independent of the processor 2010. The processor 2010 may correspond to the processing unit in FIG. 3.

The transceiver 2020 and the antenna 2040 may correspond to the transceiver unit in FIG. 6, and may also be referred to as a transceiver unit. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device 2000 shown in FIG. 7 can implement each process of the terminal device in the method embodiment shown in FIG. 2 or FIG. 4. Operations and/or functions of the modules in the terminal device 2000 are separately intended to implement corresponding procedures in the foregoing method embodiments. For details, refer to descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of sending or receiving that is performed by the terminal device to or from the access network device and that is described in the foregoing method embodiments. For details, refer to the descriptions in the foregoing method embodiments. Details are not described herein again.

Optionally, the terminal device 2000 may further include a power supply 2050, configured to supply power to various components or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 8 is a schematic diagram of a structure of a communication apparatus 1500 according to an embodiment of this application. The apparatus is configured to implement functions of the AMF in the foregoing methods. The apparatus may be an AMF, or may be an apparatus that can be used together with the AMF. For example, the apparatus may be installed in the AMF, or may be disposed independently. This is not limited. The apparatus may be a chip system. In this embodiment of this application, the chip system may include a chip, or may include a chip and another discrete component. The apparatus 1500 includes at least one processor 1520, configured to implement the functions of the AMF in the methods provided in embodiments of this application.

Optionally, the apparatus 1500 may further include at least one memory 1530, configured to store program instructions and/or data. The memory 1530 is coupled to the processor 1520. Couplings in embodiments of this application are indirect couplings or communication connections between apparatuses, units, or modules, may be implemented in electronic, mechanical, or other forms, and are used for information exchange between the apparatuses, the units, and the modules. The processor 1520 may cooperate with the memory 1530. The processor 1520 may execute the program instructions stored in the memory 1530. At least one of the at least one memory may be included in the processor.

The apparatus 1500 may further include a communication interface 1510, configured to communicate with another device through a transmission medium, to enable an apparatus in the apparatus 1500 to communicate with the another device. In this embodiment of this application, the communication interface may be a transceiver, an interface, a bus, a circuit, a pin, or an apparatus that can implement a transceiver function. For example, the another device may be a terminal device, an SMF, or an access network device. The processor 1520 receives and sends data through the communication interface 1510, and is configured to implement the methods performed by the AMF in the embodiments corresponding to FIG. 2 to FIG. 5.

In this embodiment of this application, a specific connection medium between the communication interface 1510, the processor 1520, and the memory 1530 is not limited. In this embodiment of this application, the memory 1530, the processor 1520, and the communication interface 1510 are connected by using a bus 1540 in FIG. 8. The bus is represented by using a bold line in FIG. 8. A manner of connection between other components is merely an example for description, and is not limited thereto. The bus may be classified into an address bus, a data bus, a control bus, and the like. For ease of representation, the bus is represented by using only a bold line in FIG. 8, but this does not mean that there is only one bus or only one type of bus.

It should be understood that the communication apparatus shown in FIG. 8 can implement the methods performed by the AMF in embodiments of this application, for example, each process related to the AMF in the method embodiments shown in FIG. 2 to FIG. 5. Operations and/or functions of modules in the communication apparatus are separately intended to implement corresponding procedures in the foregoing method embodiments. For details, refer to descriptions in the foregoing method embodiments. To avoid repetition, detailed descriptions are properly omitted herein.

It should be understood that the communication apparatus shown in FIG. 8 is merely a possible architecture of the AMF, and should not constitute any limitation on this application.

An embodiment of this application further provides a processing apparatus. The apparatus includes a processor and an interface. The processor is configured to perform the method according to any one of the foregoing method embodiments.

It should be understood that the processing apparatus may be one or more chips. For example, the processing apparatus may be a field programmable gate array (field programmable gate array, FPGA), an application-specific integrated circuit (application-specific integrated circuit, ASIC), a system on chip (system on chip, SoC), a central processor unit (central processor unit, CPU), a network processor (network processor, NP), a digital signal processor (digital signal processor, DSP), a micro controller unit (micro controller unit, MCU), a programmable controller (programmable logic device, PLD), or another integrated chip.

In an implementation process, steps in the foregoing methods may be completed by using a hardware integrated logic circuit in the processor or instructions in a form of software. The steps in the methods disclosed with reference to embodiments of this application may be directly performed and completed by using a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor. To avoid repetition, details are not described herein again.

It should be noted that the processor in embodiments of this application may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by using a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor.

It may be understood that, in embodiments of this application, the memory may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example, and not limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the system and method described in this specification includes but is not limited to these memories and any memory of another proper type.

According to the methods provided in embodiments of this application, this application further provides a computer program product. The computer program product includes computer program code. When the computer program code is run on a computer, the computer is enabled to perform the methods in the foregoing embodiments.

According to the methods provided in embodiments of this application, this application further provides a computer-readable storage medium. The computer-readable storage medium stores program code. When the program code is run on a computer, the computer is enabled to perform the method performed by any network element (a terminal device or an AMF) in the foregoing embodiments.

According to the methods provided in embodiments of this application, this application further provides a system. The system includes the foregoing terminal device and the foregoing AMF.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on the computing device may be components. One or more components may reside within a process and/or a thread of execution, and a component may be located on one computer and/or distributed between two or more computers. In addition, these components may be executed by various computer-readable media that store various data structures. For example, the components may communicate by using a local and/or remote process and based on a signal having one or more data packets (for example, data from two components interacting with another component in a local system, a distributed system, and/or across a network such as the internet interacting with another system by using the signal).

A person skilled in the art may further understand that various illustrative logical blocks (illustrative logical blocks) and steps (steps) that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of embodiments of this application.

The technologies described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may alternatively be implemented by using a combination of computing apparatuses, such as a digital signal processor and a microprocessor, a plurality of microprocessors, one or more microprocessors in combination with a digital signal processor core, or any other similar configuration.

All or a part of the foregoing embodiments may be implemented by using software, hardware, firmware, or any combination thereof. When software is used for implementation, all or a part of embodiments may be implemented in a form of a computer program product. The computer program product includes one or more computer instructions. When the computer instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid-state disk, SSD)), or the like.

It should be understood that an "embodiment" mentioned in the entire specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments in any appropriate manner.

It should be further understood that, in this application, "when" and "if" mean that UE or a base station performs corresponding processing in an objective situation, but do not constitute any limitation on time, do not require the UE or the base station to perform a determining action during implementation, and do not mean other limitations either.

A person of ordinary skill in the art may understand that various reference numerals such as "first" and "second" in this application are merely used for differentiation for ease of description, and are not used to limit a scope of embodiments of this application, or represent a sequence.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural.

The character "/" usually indicates an "or" relationship between the associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B and C all exist. A may be singular or plural, B may be singular or plural, and C may be singular or plural.

It should be understood that, in embodiments of this application, "B corresponding to A" indicates that B is associated with A, and B may be determined based on A. However, it should further be understood that determining B based on A does not mean that B is determined based only on A, and B may alternatively be determined based on A and/or other information.

A person of ordinary skill in the art may be aware that, with reference to the examples described in embodiments disclosed in this specification, units and algorithm steps can be implemented by electronic hardware or a combination of computer software and electronic hardware. Whether the functions are performed by using hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In several embodiments provided in this application, it should be understood that the disclosed system, apparatus, and method may be implemented in another manner. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, or a network device) to perform all or some of the steps in the methods described in embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, applied to a terminal device and comprising:
- determining first indication information based on states of a plurality of universal subscriber identity modules (USIMs), wherein
  - the first indication information indicates to enable or disable a paging enhancement function, and
  - the terminal device comprises the plurality of USIMs; and
- sending the first indication information to an access and mobility management function,
- wherein the paging enhancement function is used to filter paging of the terminal device based on whether service information that triggers paging matches service information reported by the terminal device to the access and mobility management function.

2. The method according to claim 1, wherein
- the first indication information indicates to enable the paging enhancement function,
- the plurality of USIMs comprise a first USIM and a second USIM,
- the first USIM is in a connected state,
- the second USIM is in an idle or inactive state, and
- the sending the first indication information to an access and mobility management function comprises:
  - sending the first indication information to an access and mobility management function corresponding to the second USIM.

3. The method according to claim 1, wherein
- the first indication information indicates to disable the paging enhancement function,
- the plurality of USIMs comprise a first USIM and a second USIM,
- the first USIM is in an idle or inactive state,
- the second USIM is in an idle or inactive state, and
- the sending the first indication information to an access and mobility management function comprises:
  - sending the first indication information to at least one of
    - an access and mobility management function corresponding to the first USIM, or
    - an access and mobility management function corresponding to the second USIM.

4. The method according to claim 1, wherein
- the first indication information further indicates to enable a paging occasion collision avoidance function,
- the plurality of USIMs comprise a first USIM and a second USIM,
- the first USIM is in an idle or inactive state,
- the second USIM is in an idle or inactive state,
- a paging occasion (PO) of the first USIM is the same as a PO of the second USIM, and
- the sending the first indication information to an access and mobility management function comprises:
  - sending the first indication information to an access and mobility management function corresponding to the first USIM or an access and mobility management function corresponding to the second USIM.

5. The method according to claim 1, wherein
- the first indication information further indicates to disable a paging occasion collision avoidance function,
- the plurality of USIMs comprise a first USIM and a second USIM,
- the first USIM is in an idle or inactive state,
- the second USIM is in a connected state, and
- the sending the first indication information to an access and mobility management function comprises:
  - sending the first indication information to an access and mobility management function corresponding to the first USIM.

6. A communication method, applied to an access and mobility management function and comprising:
- receiving first indication information from a terminal device, wherein the terminal device comprises a plurality of universal subscriber identity modules (USIMs), and the first indication information is determined based on states of the plurality of USIMs; and
- enabling or disabling a paging enhancement function based on the first indication information,
- wherein the paging enhancement function is used to filter paging of the terminal device based on whether service information that triggers paging matches service information reported by the terminal device to the access and mobility management function.

7. The method according to claim 6, wherein
- the first indication information indicates to enable the paging enhancement function,
- the plurality of USIMs comprise a first USIM and a second USIM,
- the first USIM is in a connected state,
- the second USIM is in an idle or inactive state, and
- the access and mobility management function is an access and mobility management function corresponding to the second USIM.

8. The method according to claim 7, wherein the method further comprises:
- sending a first notification message to a session management function of the second USIM, wherein the first notification message notifies the session management function to enable the paging enhancement function.

9. The method according to claim 6, wherein
the first indication information indicates to disable the paging enhancement function,
the plurality of USIMs comprise a first USIM and a second USIM,
the first USIM is in an idle or inactive state,
the second USIM is in an idle or inactive state, and
the access and mobility management function is at least one of
an access and mobility management function corresponding to the first USIM, or
an access and mobility management function corresponding to the second USIM.

10. The method according to claim 9, wherein the method further comprises:
sending a second notification message to a session management function corresponding to the first USIM or a session management function corresponding to the second USIM, wherein the second notification message notifies the session management function to disable the paging enhancement function.

11. The method according to claim 6, wherein
the first indication information further indicates to enable a paging occasion collision avoidance function,
the plurality of USIMs comprise a first USIM and a second USIM,
the first USIM is in an idle or inactive state,
the second USIM is in an idle or inactive state,
a paging occasion (PO) of the first USIM is the same as a PO of the second USIM, and
the access and mobility management function is an access and mobility management function corresponding to the first USIM or an access and mobility management function corresponding to the second USIM.

12. The method according to claim 11, wherein the method further comprises:
enabling the paging occasion collision avoidance function by:
sending a paging message to an access network device, wherein the paging message indicates to enable the paging occasion collision avoidance function.

13. The method according to claim 6, wherein
the first indication information further indicates to disable a paging occasion collision avoidance function,
the plurality of USIMs comprise a first USIM and a second USIM,
the first USIM is in an idle or inactive state,
the second USIM is in a connected state, and
the access and mobility management function is an access and mobility management function corresponding to the first USIM.

14. A communication apparatus, wherein the apparatus is applied to a terminal device, and comprises:
a processor, configured to determine first indication information based on states of a plurality of universal subscriber identity modules (USIMs), wherein
the first indication information indicates to enable or disable a paging enhancement function, and
the terminal device comprises the plurality of USIMs; and
a transceiver circuit, configured to send the first indication information to an access and mobility management function,
wherein the paging enhancement function is used to filter paging of the terminal device based on whether service information that triggers paging matches service information reported by the terminal device to the access and mobility management function.

15. The apparatus according to claim 14, wherein
the first indication information indicates to enable the paging enhancement function,
the plurality of USIMs comprise a first USIM and a second USIM,
the first USIM is in a connected state,
the second USIM is in an idle or inactive state, and
that the transceiver circuit is configured to send the first indication information to the access and mobility management function comprises:
sending the first indication information to an access and mobility management function corresponding to the second USIM.

16. The apparatus according to claim 14, wherein
the first indication information indicates to disable the paging enhancement function,
the plurality of USIMs comprise a first USIM and a second USIM,
the first USIM is in an idle or inactive state,
the second USIM is in an idle or inactive state, and
that the transceiver circuit is configured to send the first indication information to the access and mobility management function comprises:
sending the first indication information to at least one of
an access and mobility management function corresponding to the first USIM, or
an access and mobility management function corresponding to the second USIM.

17. The apparatus according to claim 14, wherein
the first indication information further indicates to enable a paging occasion collision avoidance function,
the plurality of USIMs comprise a first USIM and a second USIM,
the first USIM is in an idle or inactive state,
the second USIM is in an idle or inactive state,
a paging occasion (PO) of the first USIM is the same as a PO of the second USIM, and
that the transceiver circuit is configured to send the first indication information to the access and mobility management function comprises:
sending the first indication information to an access and mobility management function corresponding to the first USIM or an access and mobility management function corresponding to the second USIM.

18. The apparatus according to claim 14, wherein
the first indication information further indicates to disable a paging occasion collision avoidance function,
the plurality of USIMs comprise a first USIM and a second USIM,
the first USIM is in an idle or inactive state, and
the second USIM is in a connected state, and
that the transceiver circuit is configured to send the first indication information to the access and mobility management function comprises:
sending the first indication information to an access and mobility management function corresponding to the first USIM.

19. A communication apparatus, wherein the apparatus is applied to an access and mobility management function, and comprises:
a transceiver circuit, configured to receive first indication information from a terminal device, wherein the terminal device comprises a plurality of universal subscriber identity modules (USIMs), and the first indication information is determined based on states of the plurality of USIMs; and a processor, configured to:

enable or disable a paging enhancement function based on the first indication information, wherein the paging enhancement function is used to filter paging of the terminal device based on whether service information that triggers paging matches service information reported by the terminal device to the access and mobility management function.

20. The apparatus according to claim 19, wherein the first indication information indicates to enable the paging enhancement function, the plurality of USIMs comprise a first USIM and a second USIM, the first USIM is in a connected state, the second USIM is in an idle or inactive state, and the access and mobility management function is an access and mobility management function corresponding to the second USIM.

21. The apparatus according to claim 20, wherein the transceiver circuit is further configured to send a first notification message to a session management function of the second USIM, and the first notification message notifies the session management function to enable the paging enhancement function.

22. The apparatus according to claim 19, wherein the first indication information indicates to disable the paging enhancement function, the plurality of USIMs comprise a first USIM and a second USIM, the first USIM is in an idle or inactive state, the second USIM is in an idle or inactive state, and the access and mobility management function is at least one of an access and mobility management function corresponding to the first USIM, or an access and mobility management function corresponding to the second USIM.

23. The apparatus according to claim 22, wherein the transceiver circuit is further configured to send a second notification message to a session management function corresponding to the first USIM or a session management function corresponding to the second USIM, and the second notification message notifies the session management function to disable the paging enhancement function.

24. The apparatus according to claim 19, wherein the first indication information further indicates to enable a paging occasion collision avoidance function, the plurality of USIMs comprise a first USIM and a second USIM, the first USIM is in an idle or inactive state, the second USIM is in an idle or inactive state, a paging occasion (PO) of the first USIM is the same as a PO of the second USIM, and the access and mobility management function is an access and mobility management function corresponding to the first USIM or an access and mobility management function corresponding to the second USIM.

25. The apparatus according to claim 24, wherein the processor is further configured to enable the paging occasion collision avoidance function by:

controlling the transceiver circuit to send a paging message to an access network device, wherein the paging message indicates to enable the paging occasion collision avoidance function.

26. The apparatus according to claim 19, wherein the first indication information further indicates to disable a paging occasion collision avoidance function, the plurality of USIMs comprise a first USIM and a second USIM, the first USIM is in an idle or inactive state, the second USIM is in a connected state, and the access and mobility management function is an access and mobility management function corresponding to the first USIM.

* * * * *